US012565147B2

(12) United States Patent
Moriyama et al.

(10) Patent No.: US 12,565,147 B2
(45) Date of Patent: Mar. 3, 2026

(54) DOOR MIRROR STRUCTURE

(71) Applicant: MAZDA MOTOR CORPORATION, Hiroshima (JP)

(72) Inventors: Yukihiro Moriyama, Aki-gun (JP); Atsushi Yakushinji, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 737 days.

(21) Appl. No.: 17/820,825

(22) Filed: Aug. 18, 2022

(65) Prior Publication Data

US 2023/0110906 A1 Apr. 13, 2023

(30) Foreign Application Priority Data

Oct. 13, 2021 (JP) ................................. 2021-168304

(51) Int. Cl.
*B60R 1/06* (2006.01)
*B60J 5/04* (2006.01)

(52) U.S. Cl.
CPC .............. *B60R 1/06* (2013.01); *B60J 5/0404* (2013.01); *B60J 5/0411* (2013.01); *B60J 5/0426* (2013.01); *B60J 5/0436* (2013.01)

(58) Field of Classification Search
CPC . B60R 1/06; B60R 1/072; B60R 1/074; B60J 5/0404; B60J 5/0411; B60J 5/0426; B60J 5/0436
USPC .................................................. 359/841, 877
See application file for complete search history.

(56) References Cited

U.S. PATENT DOCUMENTS

| | | | | | |
|---|---|---|---|---|---|
| 2,871,761 | A | * | 2/1959 | Suyder | B60R 1/006 |
| | | | | | 116/56 |
| 5,886,838 | A | * | 3/1999 | Kuramoto | B60R 1/07 |
| | | | | | 359/881 |
| 5,940,230 | A | * | 8/1999 | Crandall | B60R 1/074 |
| | | | | | 248/479 |
| 10,780,829 | B2 | * | 9/2020 | Van Houten, II | B60R 1/074 |
| 11,981,262 | B2 | * | 5/2024 | Moriyama | B60R 1/006 |
| 12,145,506 | B2 | * | 11/2024 | Moriyama | B60J 5/0404 |
| 12,227,132 | B2 | * | 2/2025 | Moriyama | B60R 1/074 |
| 12,291,149 | B2 | * | 5/2025 | Moriyama | B60W 10/30 |
| 12,325,359 | B2 | * | 6/2025 | Moriyama | B60R 1/074 |

(Continued)

FOREIGN PATENT DOCUMENTS

| | | | |
|---|---|---|---|
| JP | 10236231 A * | 9/1998 | |
| JP | 2020-179680 A | 11/2020 | |

*Primary Examiner* — Ricky D Shafer
(74) *Attorney, Agent, or Firm* — Studebaker Brackett PLLC

(57) ABSTRACT

A door mirror structure comprises a door-mirror body portion, a mirror base having a tip-end portion fixed to the door-mirror body portion, and a drive unit to rotate the door-mirror body portion and the mirror base between a mirror-use position and a mirror-storage position. The drive unit is provided at the side door. The housing of the door-mirror body portion has a shape such that the door-mirror body portion taking the mirror-use position is not positioned in an area between a first imaginary line which connects a middle point between both eyes of a driver and an inner-end portion, in a vehicle width direction, of a rear face of the door-mirror body portion and a second imaginary line which connects the above-described middle point and a front end portion of a door glass.

11 Claims, 18 Drawing Sheets

(56)  References Cited

U.S. PATENT DOCUMENTS

| | | | |
|---|---|---|---|
| 2006/0132282 A1* | 6/2006 | McCall | B60R 1/12 |
| | | | 340/5.2 |
| 2008/0088960 A1* | 4/2008 | Sim | B60R 1/07 |
| | | | 359/873 |
| 2009/0122431 A1* | 5/2009 | Horii | B60R 1/06 |
| | | | 359/872 |
| 2017/0210297 A1* | 7/2017 | Kim | G01S 17/931 |
| 2020/0023774 A1* | 1/2020 | Lamorte | G01S 17/931 |
| 2020/0339036 A1 | 10/2020 | Kenmochi et al. | |
| 2022/0342066 A1* | 10/2022 | Burger | G01S 13/58 |
| 2023/0110177 A1* | 4/2023 | Moriyama | B60R 1/074 |
| | | | 359/841 |
| 2023/0110322 A1* | 4/2023 | Moriyama | B60R 1/074 |
| | | | 359/841 |

* cited by examiner

DOOR MIRROR STRUCTURE

BACKGROUND OF THE INVENTION

The present invention relates to a door mirror structure.

Conventionally, a door mirror structure which is provided with an electromotive rotational unit in order to automatically rotate a door mirror between a usable position and a storage position is known as described in Japanese Patent Laid-Open Publication No. 2020-179680 (US 2020/0339036 A1).

This door mirror structure comprises a door-mirror body portion provided with a mirror, a mirror base protruding, in a vehicle width direction, from a side door, and the electromotive rotational unit stored in the door-mirror body portion. The mirror base is a portion which has a base-end portion and a tip-end portion, extends in the vehicle width direction, and forms an arm portion of the door mirror. The base-end portion of the mirror base is fixed to the side door, and to the tip-end portion of the mirror base is attached the door-mirror body portion so as to rotate around a rotational axis extending in a vertical direction.

The door-mirror body portion is rotated at the tip-end portion of the mirror base by receiving a rotational drive force of the electromotive rotational unit stored therein, so that the door-mirror body portion is rotatable between the mirror-use position and the mirror-storage position. The mirror-use position is the position where the door-mirror body portion protrudes toward an outward side, in the vehicle width direction, from the tip-end portion of the mirror base and the mirror is visible from a cabin inside. Meanwhile, the mirror-storage position is the one where the door-mirror body portion extends substantially in parallel to the side door.

In the above-described door mirror structure, since the electromotive rotational unit is stored inside the door-mirror body portion, a moment applied in a vertical direction which is generated at a position of the electromotive rotational unit becomes large in proportion to the length of the mirror base. Consequently, there is a problem that vibrations of the mirror generated during vehicle traveling may become improperly large.

Further, since the electromotive rotational unit is stored inside the door-mirror body portion, the longitudinal width (i.e., the width in a vehicle longitudinal direction) of the door-mirror body portion becomes large. Consequently, there is a concern that the visibility from the cabin inside may be hindered by the door-mirror body portion.

Meanwhile, while the above-described problem is solved in a case where the electromotive rotational unit is removed from the door mirror, the door-mirror body portion needs to be stored manually in this case, which may deteriorate the user convenience.

SUMMARY OF THE INVENTION

The present invention has been devised in view of the above-described problems, and an object of the present invention is to provide a door mirror structure provided with the electromotive rotational unit which can compatibly attain properly suppression of the vibrations of the mirror during the vehicle traveling and improvement of the visibility from the cabin inside.

The door mirror structure of the present invention comprises a door-mirror body portion provided with a mirror to obtain a rearward visual field of the vehicle and a housing holding the mirror, a mirror base having a tip-end portion fixed to the door-mirror body portion and a base-end portion provided away from the tip-end portion, the base-end portion being attached to the side door such that the door-mirror body portion and the mirror base is rotatable between a mirror-use position where the mirror is visible from a cabin inside and a mirror-storage position which is located on an inward side, in a vehicle width direction, of the mirror-use position, and a drive unit to rotate the door-mirror body portion and the mirror base between the mirror-use position and the mirror-storage position, wherein the drive unit is provided at the side door, and the housing of the door-mirror body portion has a shape such that the door-mirror body portion taking the mirror-use position is not positioned in an area between a first imaginary line which connects a middle point between both eyes of a driver of the vehicle and an inner-end portion, in the vehicle width direction, of a rear face of the door-mirror body portion and a second imaginary line which connects the above-described middle point and a front end portion of a door glass provided at the side door.

According to the present invention, since the drive unit which is a heavy object is provided at the side door, the vertical moment generated at the door mirror which is caused by a road-surface input during the vehicle traveling (i.e., vibrations or outer forces which are mainly generated in a vertical direction, which may be caused by an unevenness (concave/convex) of the road surface) can be decreased, so that the vibrations of the mirror can be suppressed.

Further, since the drive unit is provided at the side door, the door-mirror body portion can be shortened in its longitudinal width and thereby compact (or thin) compared with a conventional door structure in which a drive unit is stored at a door-mirror body portion. Thus, according to the door mirror structure, the shape of the housing of the door-mirror body portion can be configured such that a space where the door-mirror body portion occupies in the conventional drive unit is reduced and thereby the visibility is improved, maintaining the automatic storing performance of the door mirror. That is, as described above, by configuring the shape of the housing of the door-mirror body portion such that the door-mirror body portion taking the mirror-use position is not positioned in the area between the first imaginary line which connects the middle point between the driver's both eyes and the inner-end portion, in the vehicle width direction, of the rear face of the door-mirror body portion and the second imaginary line which connects the above-described middle point and the front end portion of the door glass provided at the side door, the visibility can be improved. Thereby, it can be suppressed that the door-mirror body portion comes into the area between the mirror inner-end portion and the glass front-end portion in the driver's view. Consequently, the visibility from the cabin inside can be improved.

Further, according to the present invention, in the door mirror structure comprising the door-mirror body portion provided with the mirror and the mirror base having the tip-end portion fixed to the door-mirror body portion, the drive unit moves the door-mirror body portion and the mirror base from the mirror-use position to the mirror-storage position. Accordingly, respective protrusion quantities of the door-mirror body portion and the mirror base which protrude from a side-door side face can be made small in a state where the door-mirror body portion and the mirror base are rotated to the mirror-storage position, so that the vehicle width can be minimized.

In the above-described door mirror structure, it is preferable that the drive unit be provided inside the side door.

Thereby, the drive unit can be protected from a foreign substance or the like which exist in the vehicle outside by an outside face of the side door.

In the above-described door mirror structure, it is preferable that this structure further comprise a rotational support axis provided to be connected to the base end portion of the mirror base and rotatably support the door-mirror body portion and the mirror base between the mirror-use position and the mirror-storage position, wherein the rotational support axis extends from the base end portion to the inside of the side door and is rotated by the drive unit.

According to this structure, since the rotational support axis to rotatably support the door-mirror body portion and the mirror base is further provided, the door-mirror body portion and the mirror base can be rotated between the mirror-use position and the mirror-storage position by rotating the door-mirror body portion and the mirror base around the rotational support axis by means of the drive unit provided inside the side door. Accordingly, rotating of the door-mirror body portion and the mirror base between the mirror-use position and the mirror-storage position can be materialized with a simple structure.

In the above-described door mirror structure, it is preferable that the drive unit be provided on an axis line of the rotational support axis.

According to this structure, since the drive unit is provided on the axis line of the rotational support axis, a power transmission system from the drive unit to the rotational support axis can be made simple and compact. Thereby, the drive unit can be properly positioned in a limited space inside the side door.

In the above-described door mirror structure, it is preferable that a penetration hole where the rotational support axis passes be formed at a door panel which constitutes an outside face of the side door, and a cover member to cover a gap between the penetration hole and the rotational support axis from a vehicle outside be provided.

According to this structure, since the cover member covers the gap between the penetration hole and the rotational support axis from the vehicle outside, appearance of the vehicle is improved, and also water can be prevented from coming into the inside of the door panel through the gap.

In the above-described door mirror structure, it is preferable that the drive unit be fixed to a frame member which is provided inside the side door and constitutes a frame of the side door.

According to this structure, since the drive unit is fixed to the frame member constituting the frame of the side door, the support rigidity of the drive unit is improved.

In the above-described door mirror structure, it is preferable that the frame member be a beltline reinforcement which extends in a vehicle longitudinal direction along a beltline at a window lower-end edge of the side door.

According to this structure, the above-described door mirror structure can be adopted to the conventional door structure widely by fixing the drive unit to the beltline reinforcement which is generally used at the conventional door structure.

In the above-described door mirror structure, it is preferable that the side door have a door opening portion which has a door-opening end portion on a vehicle forward side of the mirror, and the shape of the housing be configured such that a ratio of an area which the housing occupies to an area of the mirror formed between an inner-end portion, in the vehicle width direction, of the mirror and the door-opening end portion in a driver' view is 10% or less.

According to this structure, the ratio of the area which the housing occupies to the area of the mirror formed between the inner-end portion, in the vehicle width direction, of the mirror and the door-opening end portion can be reduced to 10% or less. Consequently, the visibility from the cabin inside can be further improved.

In the above-described door mirror structure, it is preferable that the shape of the housing be configured such that an angle formed between the rear face of the door-mirror body portion and an inner face of the door-mirror body portion which faces the side door in a plan view forms an acute angle.

According to this structure, the visual field from the cabin inside is not interrupted by the inner face of the door-mirror body portion, so that the visibility from the cabin inside can be improved securely.

In the above-described door mirror structure, it is preferable that the door-mirror body portion taking the mirror-use position be configured such that a width, in a longitudinal direction, of the door-mirror body portion becomes narrower from a middle position, in the vehicle width direction, of the door-mirror body portion toward an inner-end portion, in the vehicle width direction, of the door-mirror body portion in a plan view.

According to this structure, since the longitudinal width of the door-mirror body portion becomes narrower from the middle position toward the inner-end portion, the visual field from the cabin inside is not interrupted by the inner face of the door-mirror body portion. Consequently, the visibility from the cabin inside is so secured at the maximum that the visibility can be improved further.

Thus, according to the door mirror structure of the above-described present invention, the suppression of the vibrations of the mirror during the vehicle traveling and the improvement of the visibility from the cabin inside can be compatibly attained.

The present invention will become apparent from the following description which refers to the accompanying drawings.

DETAILED DESCRIPTION OF THE INVENTION

Hereafter, a preferable embodiment of the present invention will be described referring to the accompanying drawings.

Figure 1:
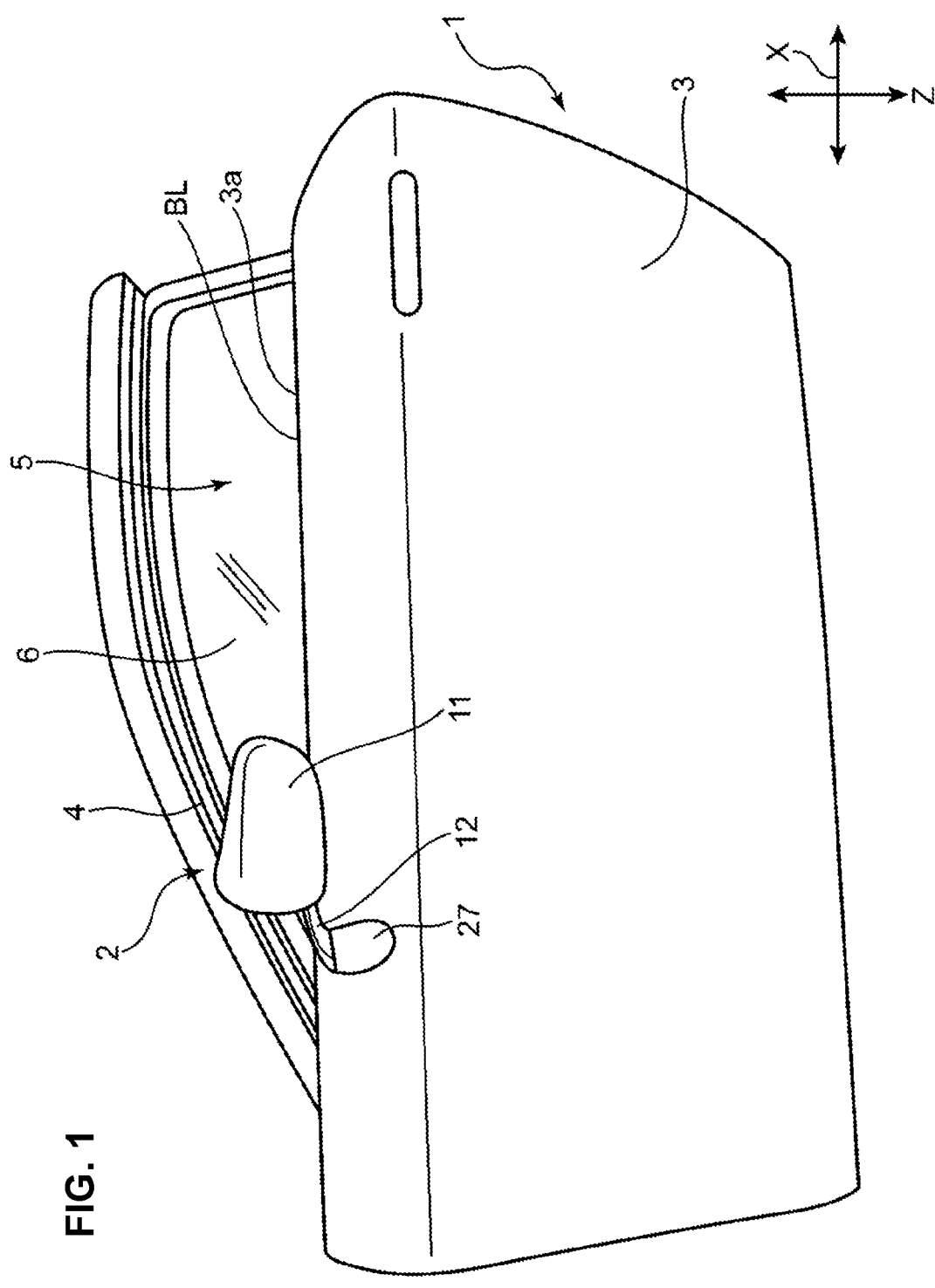
FIG. 1 is a perspective view showing a whole structure of a side door with a door mirror to which a door mirror structure according to an embodiment of the present invention is applied.
Figure 2:
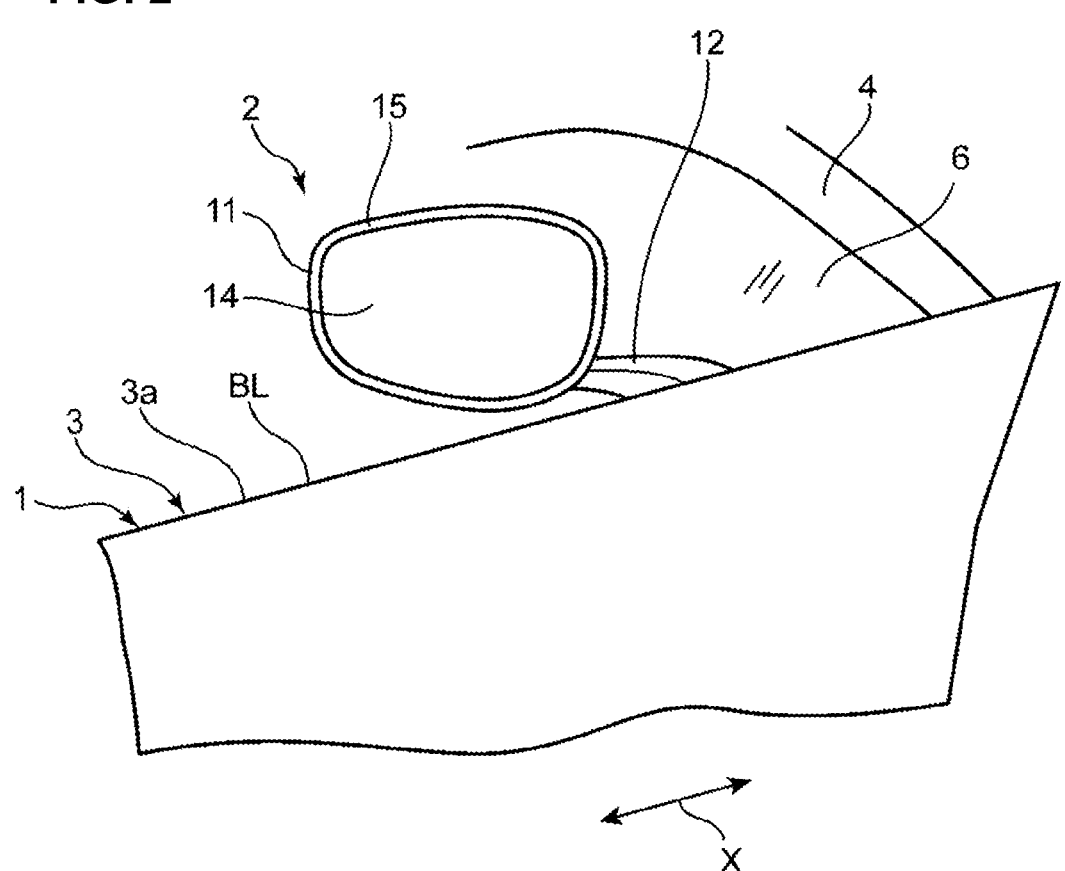
FIG. 2 is a view of the door mirror shown in FIG. 1, when viewed from a cabin inside.
Figure 3:
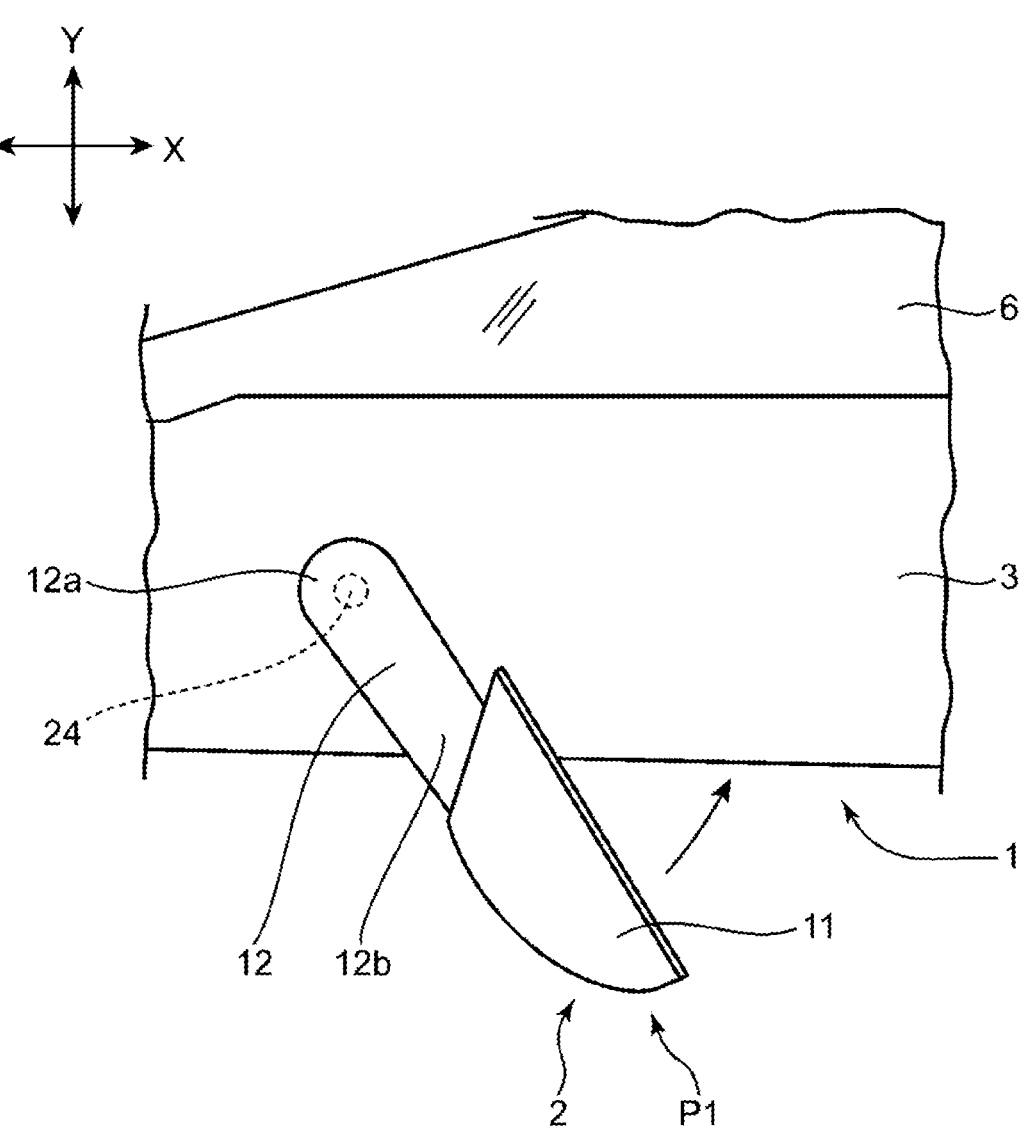
FIG. 3 is a plan view showing a state where the door mirror shown in FIG. 1 takes its use position.

FIGS. 1 and 2 show a side door 1 of a vehicle to which a door mirror structure of the present invention is applied. The side door 1 is configured such that a door mirror 2 is arranged near a beltline BL at an upper end 3a of a door panel 3 and on a vehicle rearward side of an A pillar 4. A door glass 6 is arranged at a door opening portion 5 which is enclosed by the A pillar 4 and the beltline BL.

The door mirror structure of the side door 1 of the vehicle according to the present embodiment is the one where the door mirror 2 which is storable in an electromotive manner is attached to the side door 1 as shown in FIGS. 1-7. Specifically, the door mirror structure primarily comprises a door-mirror body portion 11 and a mirror base 12 which constitute the door mirror 2, and an electromotive rotational unit 13 for rotating of the door-mirror body portion 11 and the mirror base 12. The electromotive rotational unit 13 is arranged inside the side door 1.

Further, the door mirror structure of the present embodiment comprises a rotational support axis 24 (see FIGS. 11 and 12) which rotatably support the door-mirror body portion 11 and the mirror base 12, a beltline reinforcement 21 as a frame member which is provided inside the side door 1, a support member 22 which fixes the electromotive rotational unit 13 to the beltline reinforcement 21, and a cover member 27 which is provided at a vehicle outside of the side door 1.

Hereafter, respective structural elements of the door mirror structure will be described in order.

As shown in FIG. 2, the door-mirror body portion 11 is provided with a mirror 14 to obtain a rearward visual field of the vehicle and a housing 15. The mirror 14, which is an optical mirror to reflect light, is held at a rearward face (specifically, a face which is directed toward a vehicle rearward side in a state where the mirror 14 takes the mirror-use position P1 shown in FIG. 3, i.e., a rear face 11e of the door-mirror body portion 11 shown in FIGS. 13 and 14 described later) of the housing 15. Further, inside the housing 15 of the door-mirror body portion 11 are stored an inner device 37 (see FIG. 12), such as a mirror-face adjusting unit for angle adjusting of a vertical direction Z and a vehicle width direction Y of the mirror 14 or a defrosting unit for the mirror 14.

The mirror base 12, which is a section to constitute an arm portion of the door mirror 2, comprises a tip-end portion 12b which is fixed to the door-mirror body portion 11 and a base-end portion 12a which is provided away from the tip-end portion 12b as shown in FIGS. 3-6.

Further specifically, the door-mirror body portion 11 is fixed to the tip-end portion 12b of the mirror base 12 such that the mirror 14 and the mirror base 12 are nearly parallel to each other.

The base-end portion 12a of the mirror base 12 is attached to the rotational support axis 24 such that the door-mirror body portion 11 and the mirror base 12 are rotatable between the mirror-use position P1 where the mirror is visible from the cabin inside and the mirror-storage position P2 which is located on the inward side, in the vehicle width direction Y, of the mirror-use position P1.

Figure 4:
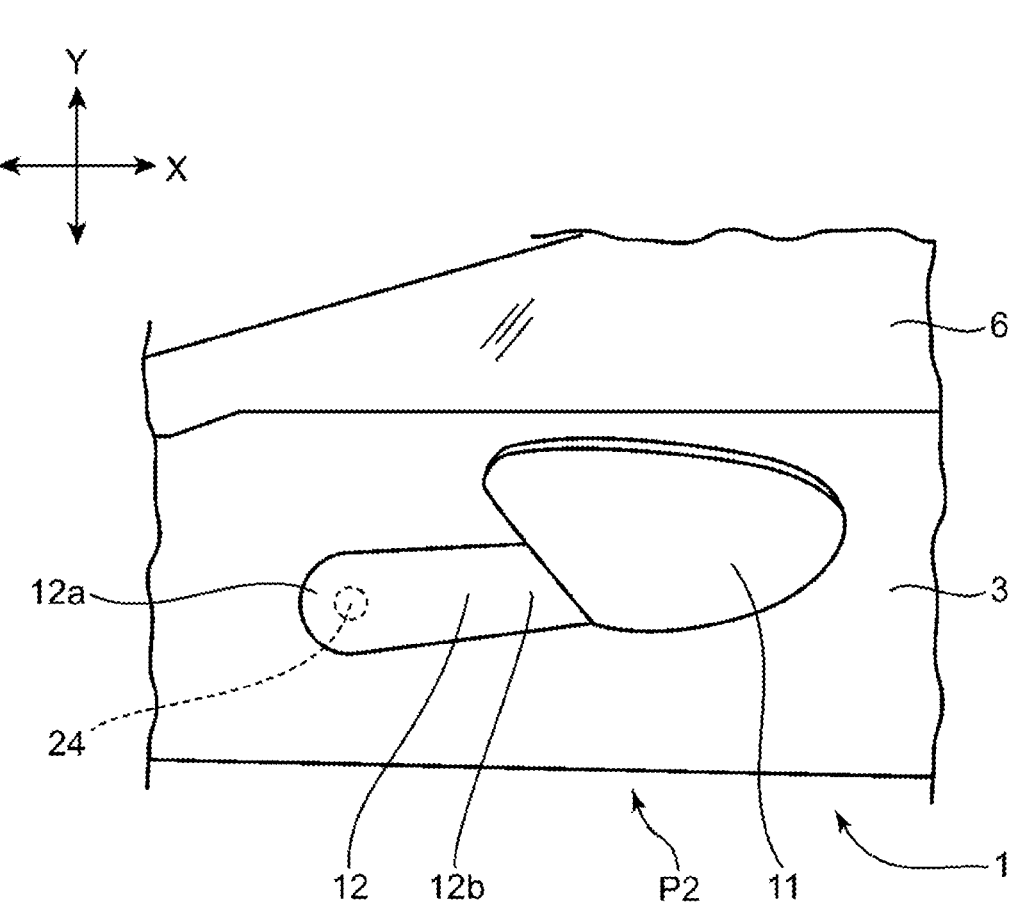
FIG. 4 is a plan view showing a state where the door mirror shown in FIG. 1 takes its storage position.
Figure 5:
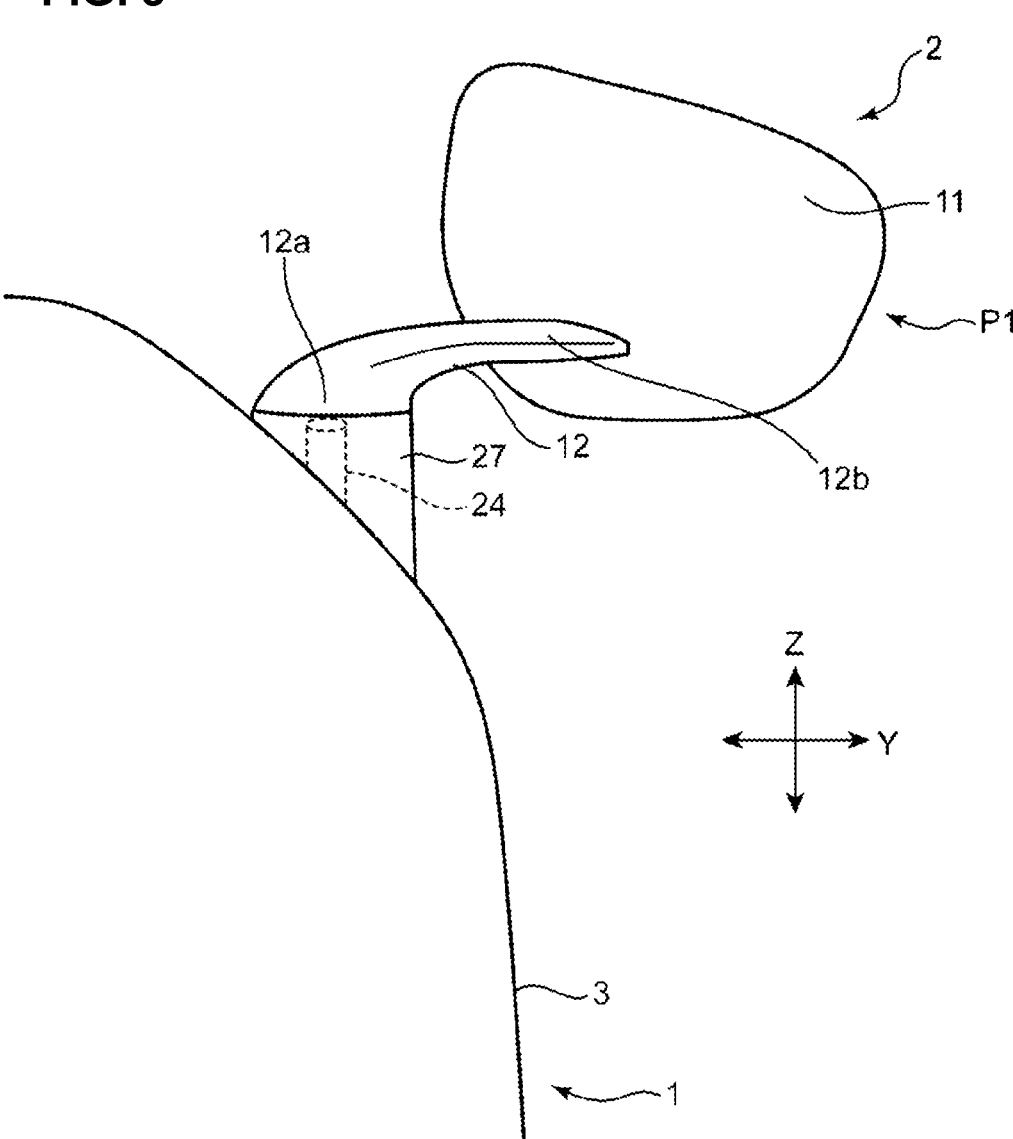
FIG. 5 is a view showing the state where the door mirror shown in FIG. 1 takes its use position, when viewed from a vehicle forward side.
Figure 6:
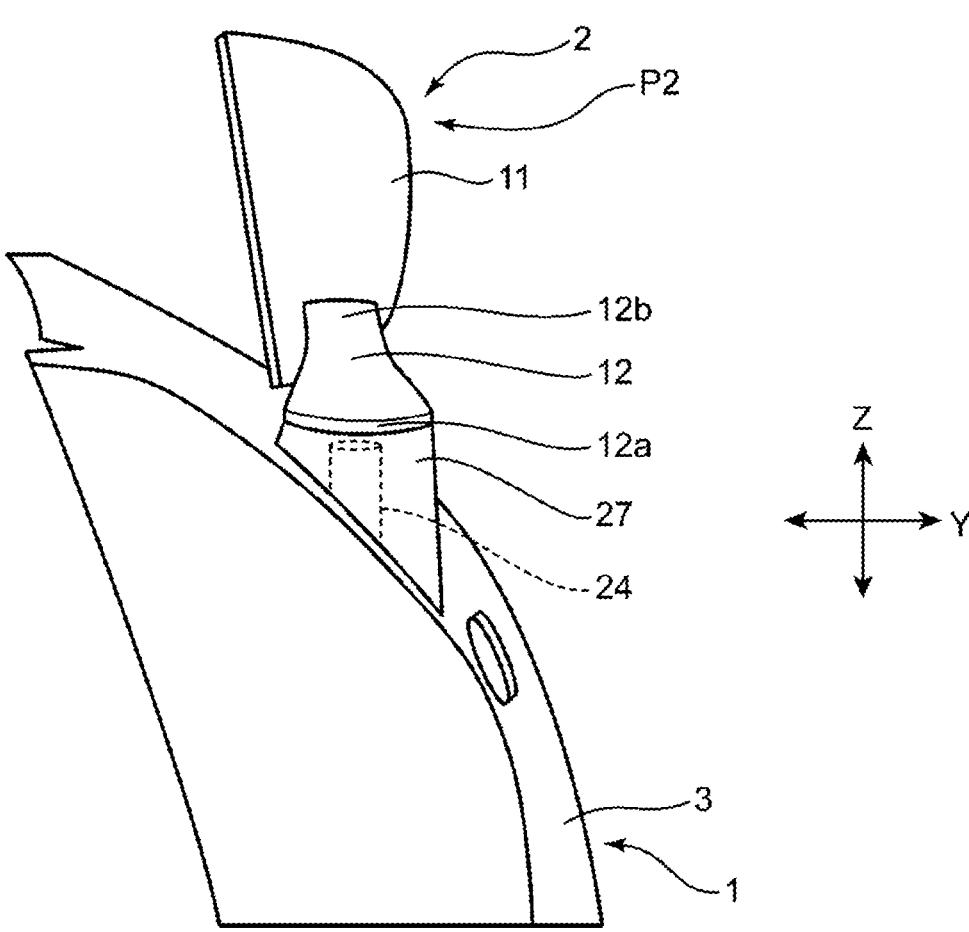
FIG. 6 is a view showing the state where the door mirror shown in FIG. 1 takes its storage position, when viewed from the vehicle forward side.

In the present embodiment, the rotational support axis 24 shown in FIGS. 9-12 is connected to the base-end portion 12a of the mirror base 12, and the rotational support axis 24 rotatably supports the door-mirror body portion 11 and the mirror base 12 between the mirror-use position P1 (see FIGS. 3 and 5) and the mirror-storage position P2 (see FIGS. 4 and 6).

The rotational support axis 24 extends from the base-end portion 12*a* into the side door 1 and is rotated by the electromotive rotational unit 13.

Specifically, as shown in FIGS. 9-12, a penetration hole 26 is formed at the door panel 3 (outer panel) which constitutes an outside face of the side door 1. The rotational support axis 24 passes through the penetration hole 26 of the door panel 3 and is coaxially connected to an output axis 35 (see FIG. 12) described later of the electromotive rotational unit 13 which is arranged in a space portion 20 inside the side door 1.

Figure 12:
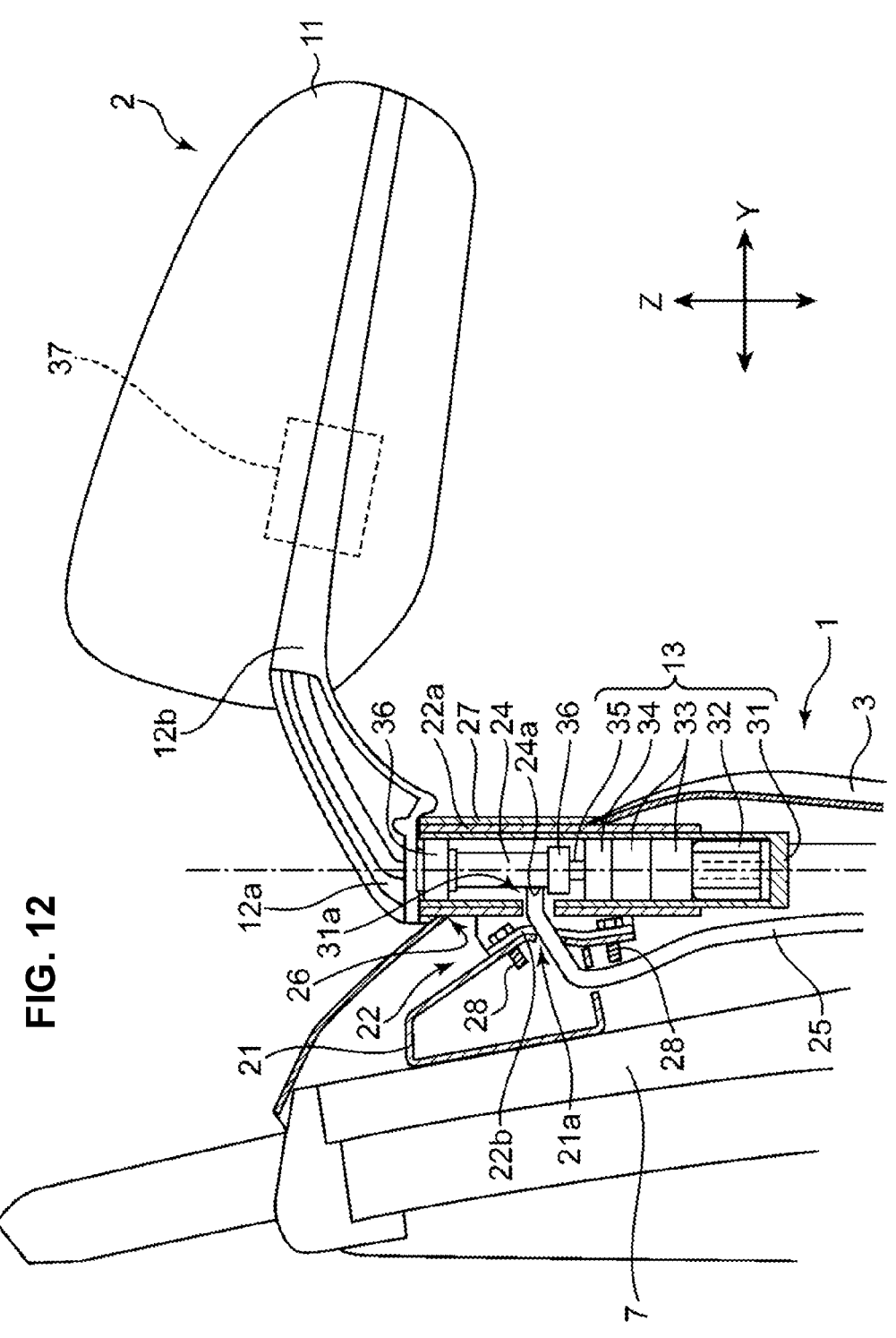
FIG. 12 is a sectional view taken along line XII-XII of FIG. 8, where the cover member is added.

The electromotive rotational unit 13 is configured to rotate the door-mirror body portion 11 and the mirror base 12 between the mirror-use position P1 and the mirror-storage position P2. Specifically, the electromotive rotational unit 13 comprises, as shown in FIG. 12, a casing 31, a motor 32, a reduction gear 33 to reduce a generation torque of the motor 32, a torque limiter 34, and the output axis 35 to output a rotational drive force. The casing 31 stores the motor 32, the reduction gear 33, the torque limiter 34, and the output axis 35 therein. Further, the rotational support axis 24 and a journal 36 to rotationally support the rotational support axis 24 are also stored in the casing 31. Accordingly, the motor 32, the reduction gear 33, the torque limiter 34, and the output axis 35, which are primary structural elements of the electromotive rotational unit 13, are arranged on the axis line of the rotational support axis 24. The output axis 35 is connected to the rotational support axis 24 integrally rotationally.

Herein, in a case where an excessive torque is generated at the rotational support axis 24 when the motor 31 is driven, the torque limiter 34 cuts transmission of the torque, so that a load of the motor 32 can be suppressed.

A ball bearing or a roller bearing which can support rotational support axis 24 with a small rotational resistance are preferable as the journal 36.

The electromotive rotational unit 13 is fixed to the beltline reinforcement 21 by the support member 22.

Figure 7:
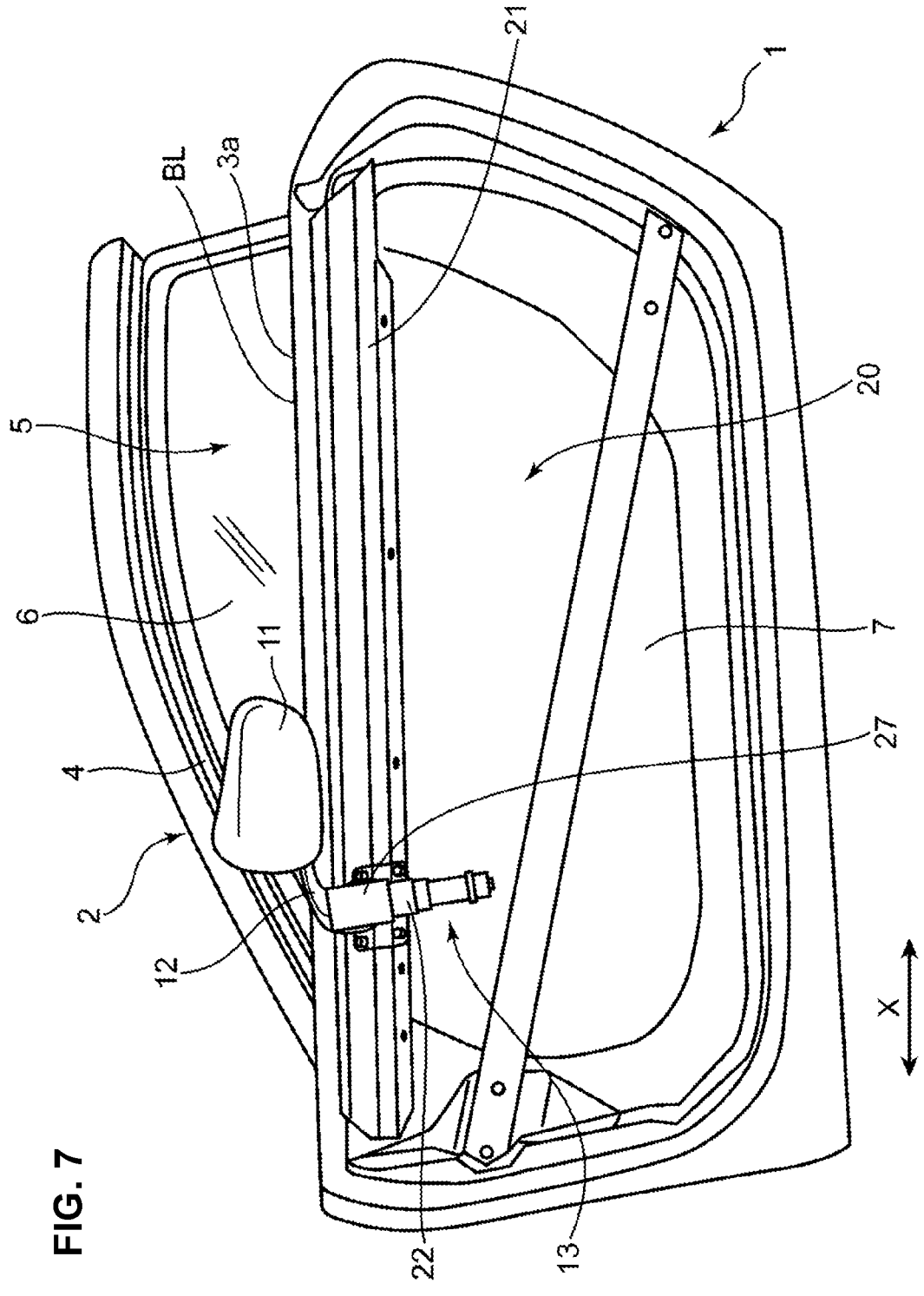
FIG. 7 is a view showing a state of the side door shown in FIG. 1 where a door outer is removed and a beltline reinforcement provided inside the side door is exposed.
Figure 8:
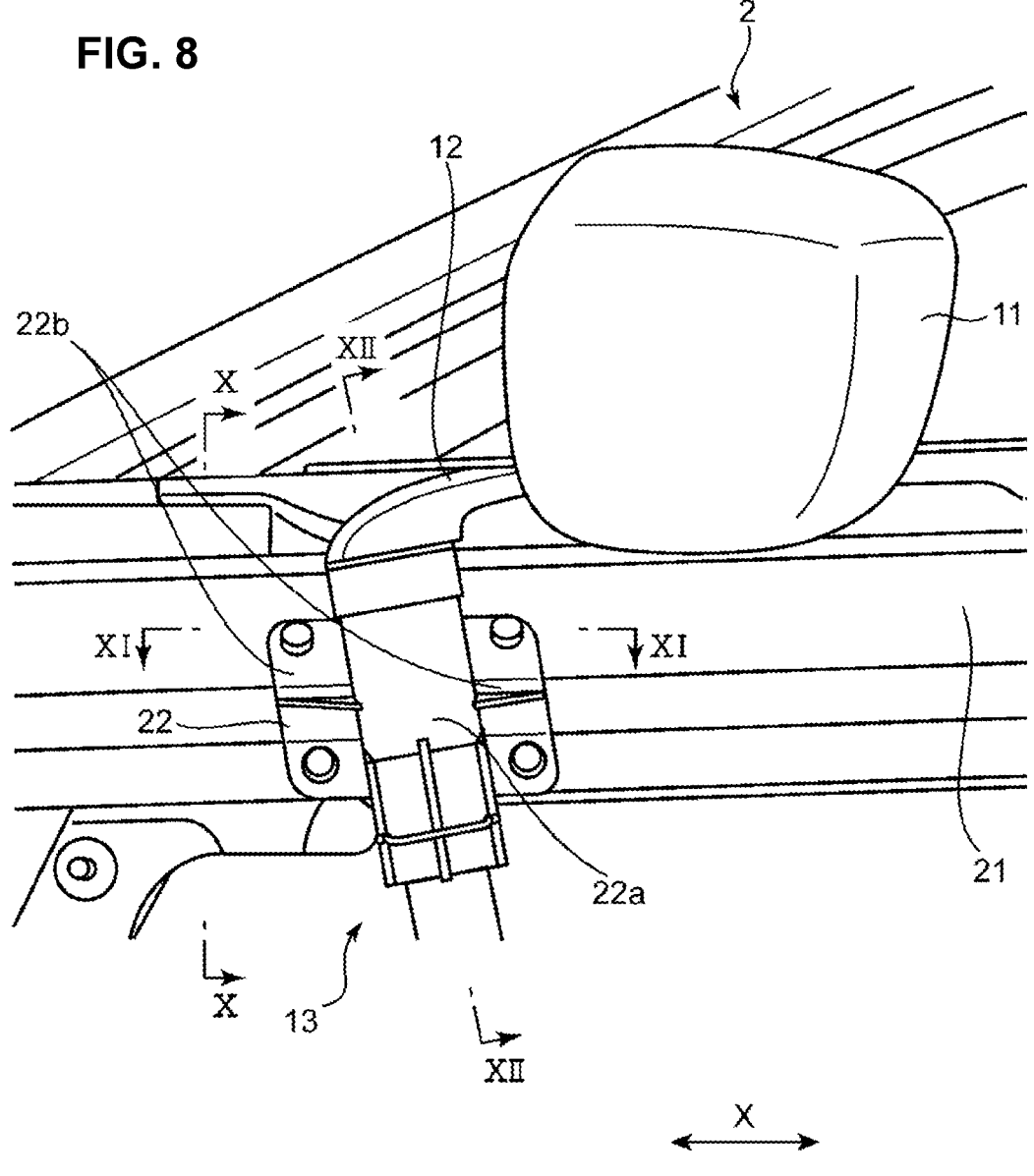
FIG. 8 is an enlarged view showing a state where a mirror and an electromotive rotational unit are fixed to the beltline reinforcement shown in FIG. 7.
Figure 9:
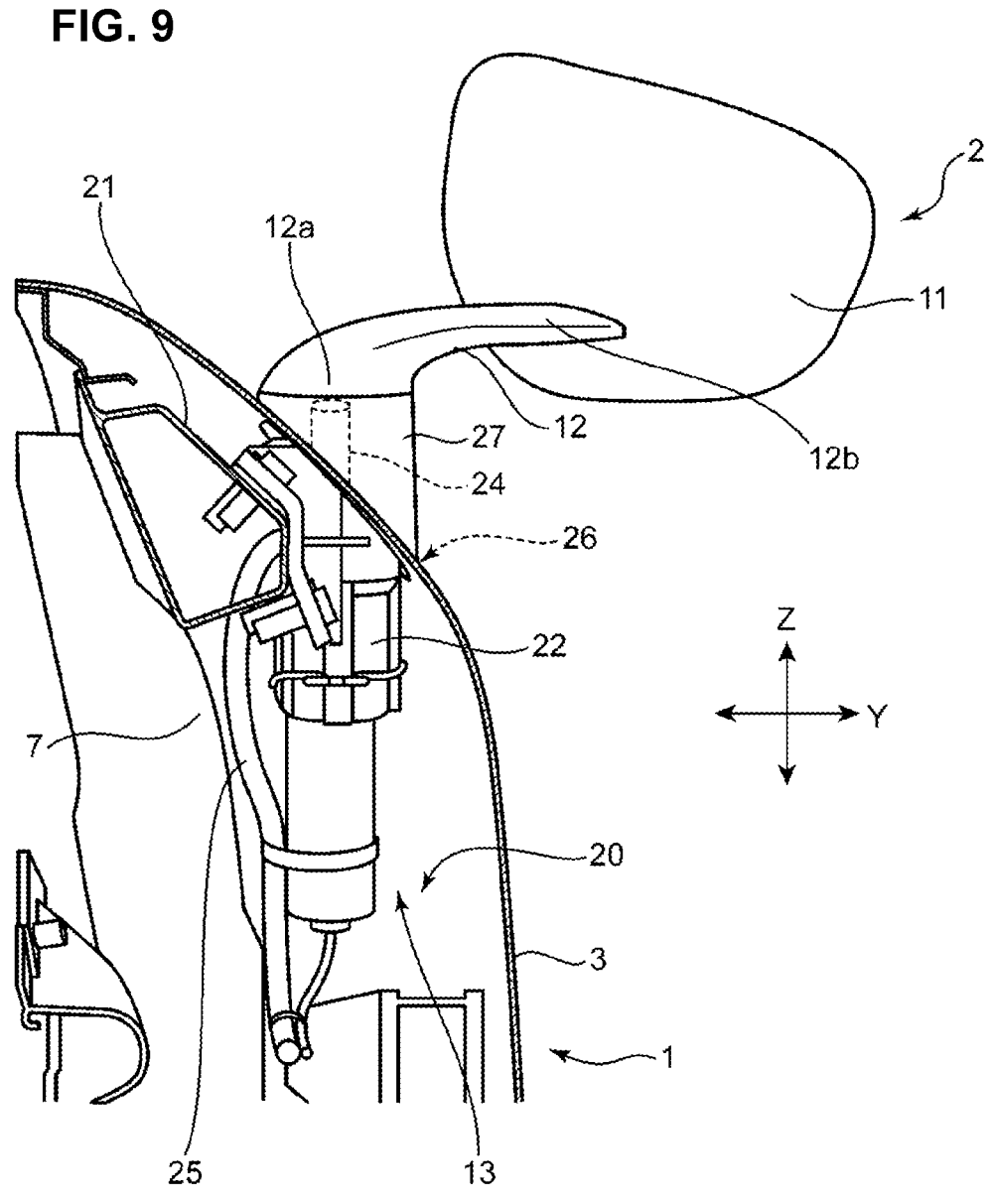
FIG. 9 is a sectional view taken along line X-X of FIG. 8, where a cover member is added.
Figure 10:
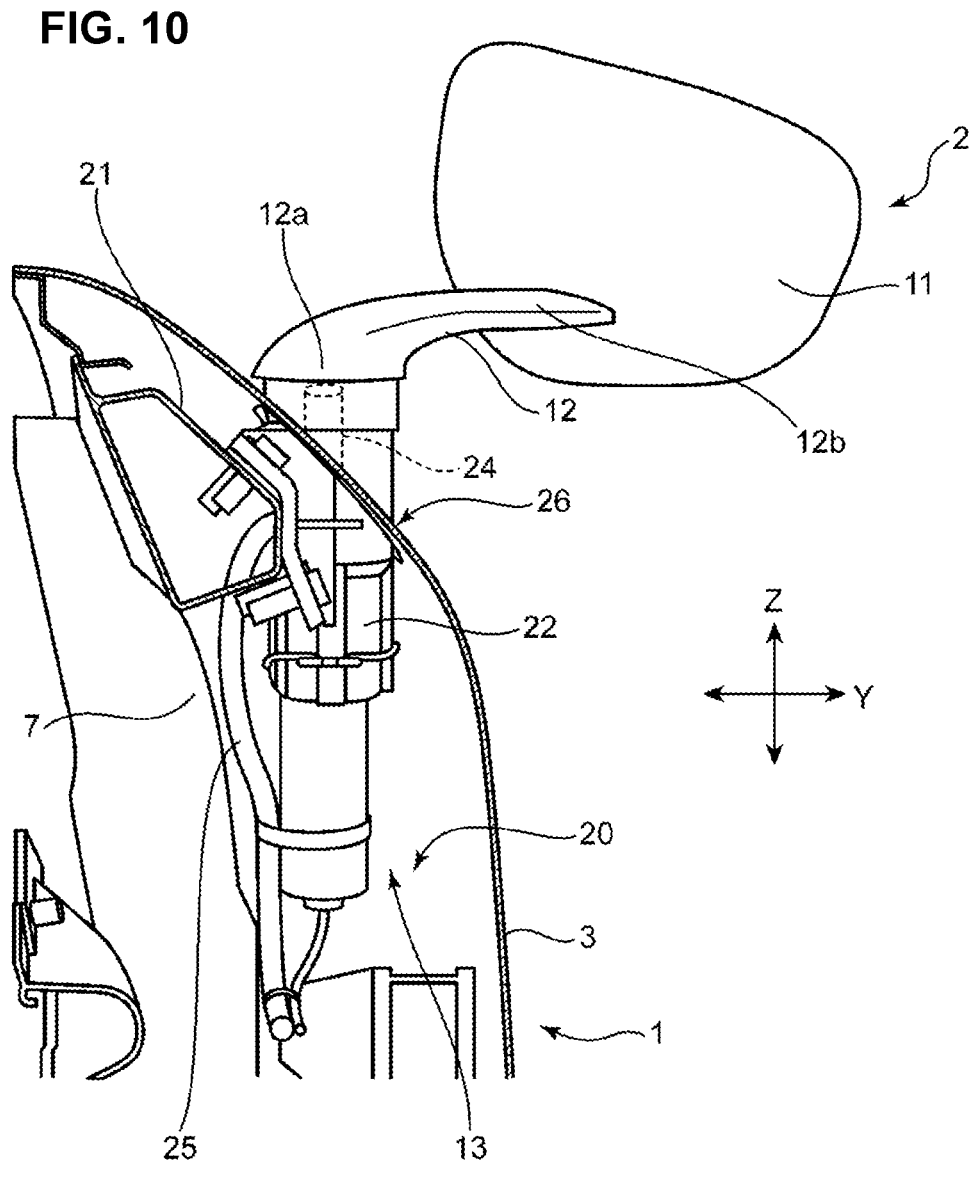
FIG. 10 is a sectional view taken along line X-X of FIG. 8.

The beltline reinforcement 21 is a frame member which is provided inside the side door 1 to constitute a frame of the side door 1. As shown in FIG. 7, the beltline reinforcement 21 is fixed to a door inner 7 (see FIGS. 7 and 12) provided inside the side door 1 such that it extends in the vehicle longitudinal direction X along the beltline BL at a window lower-end edge (i.e., a lower-end edge of the door opening portion 5 where the door glass 6 is arranged). The beltline reinforcement 21 of the present embodiment is made of an aluminum-made extrusion material.

Specifically, as shown in FIGS. 8-12, the support member 22 comprises a semi-cylindrical shaped holding portion 22*a* and a pair of fixation portions 22*b* which are provided at both sides, in the vehicle longitudinal direction X, of the holding portion 22*a*. The holding portion 22*a* holds a casing 31 which stores the electromotive rotational unit 13 and the rotational support axis 24 therein. The pair of fixation portions 22*b* are fastened to the beltline reinforcement 21 by bolts 28.

Further, in the present embodiment, as shown in FIG. 9-12, a harness 25 extends from the space portion 20 inside the side door 1 to the door-mirror body portion 11 and is electrically coupled to the inner device 37 (the mirror-face adjusting unit etc.) provided inside the door-mirror body portion 11.

Figure 11:
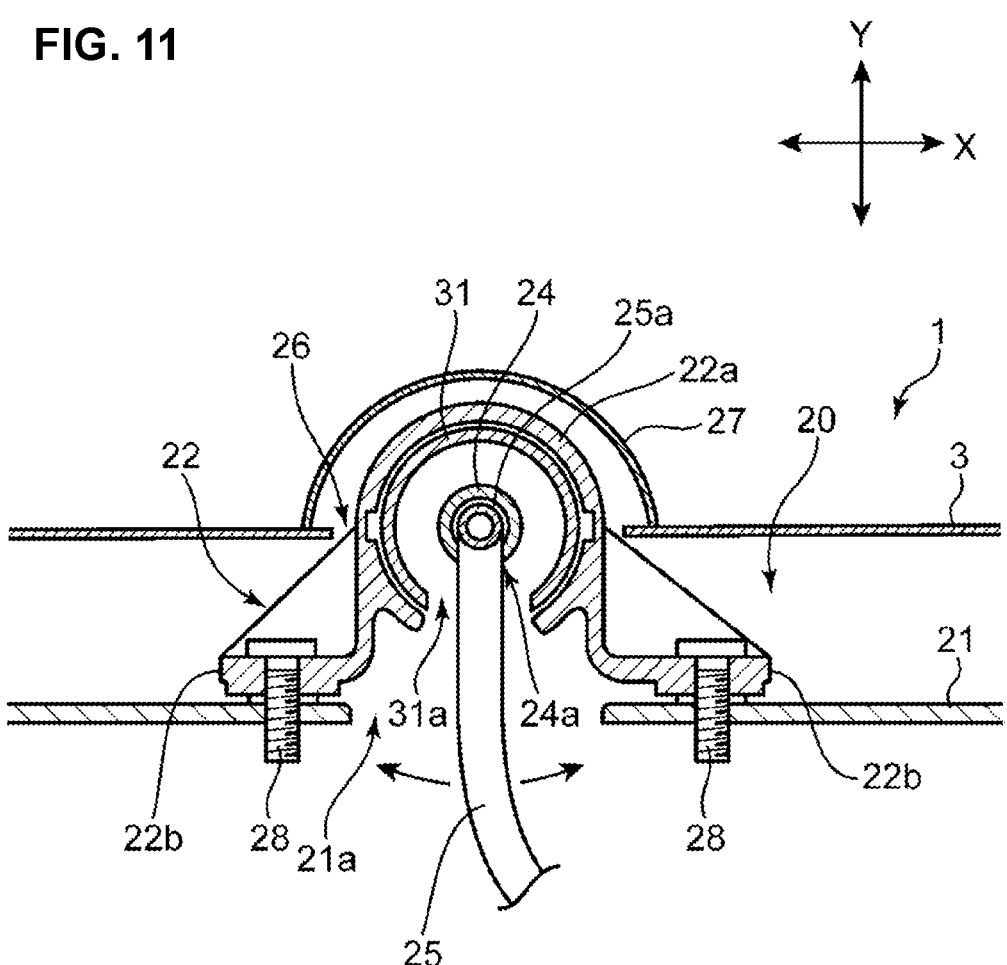
FIG. 11 is a sectional view taken along line XI-XI of FIG. 8.

Specifically, as shown in FIGS. 11 and 12, the beltline reinforcement 21 has a first opening 21*a* at a position which faces the holding portion 22*a* of the support member 22. Further, the casing 31 of the electromotive rotational unit 13 has a second opening 31*a* at a position which faces the first opening 21*a*. Further, the rotational support axis 24 of the present embodiment is of a hollow cylindrical shape, and a third opening 24*a* is formed at its peripheral surface at a position which faces the second opening 31*a*. Accordingly, the harness 25 extends from the inside of the side door 1 to the inside of the rotational support axis 24 passing through the first opening 21*a* of the beltline reinforcement 21, the second opening 31*a* of the casing 31, and the third opening 24*a* of the rotational support axis 24 (see a portion 25*a* of the harness 25 shown in FIG. 11 which extends upwardly passing through the inside of the rotational support axis 24). Further, the harness 25 extends to the inner device 37 provided inside the door-mirror body portion 11 passing through the respective insides of the rotational support axis 24 and the mirror base 12, and is electrically coupled to the inner device 37.

Herein, in the door mirror structure of the present embodiment, since the holding portion 22*a* of the support member 22 is of the semi-cylindrical shape, even if the harness 25 is arranged as described above, the casing 31 can be inserted into the holding portion 22*a* of the support member 22 from above without any interference of the harness 25 with the holding portion 22*a*.

The cover member 27 is configured to cover a gap between the penetration hole 26 and the rotational support axis 24 from the vehicle outside. Specifically, as shown in FIGS. 9-12, the casing 31 of the electromotive rotational unit 13 where the rotational support axis 24 is stored and the holding portion 22*a* of the support member 22 which covers the casing 31 are exposed to the vehicle outside through the penetration hole 26 of the door panel 3. The cover member 27 covers the casing 31 and the holding portion 22*a* which store the rotational support axis 24 therein from the outside at a position located below the base-end portion 12*a* of the mirror base 12 and also covers a gap between the penetration hole 26 and the holding portion 22*a*.

Figure 13:
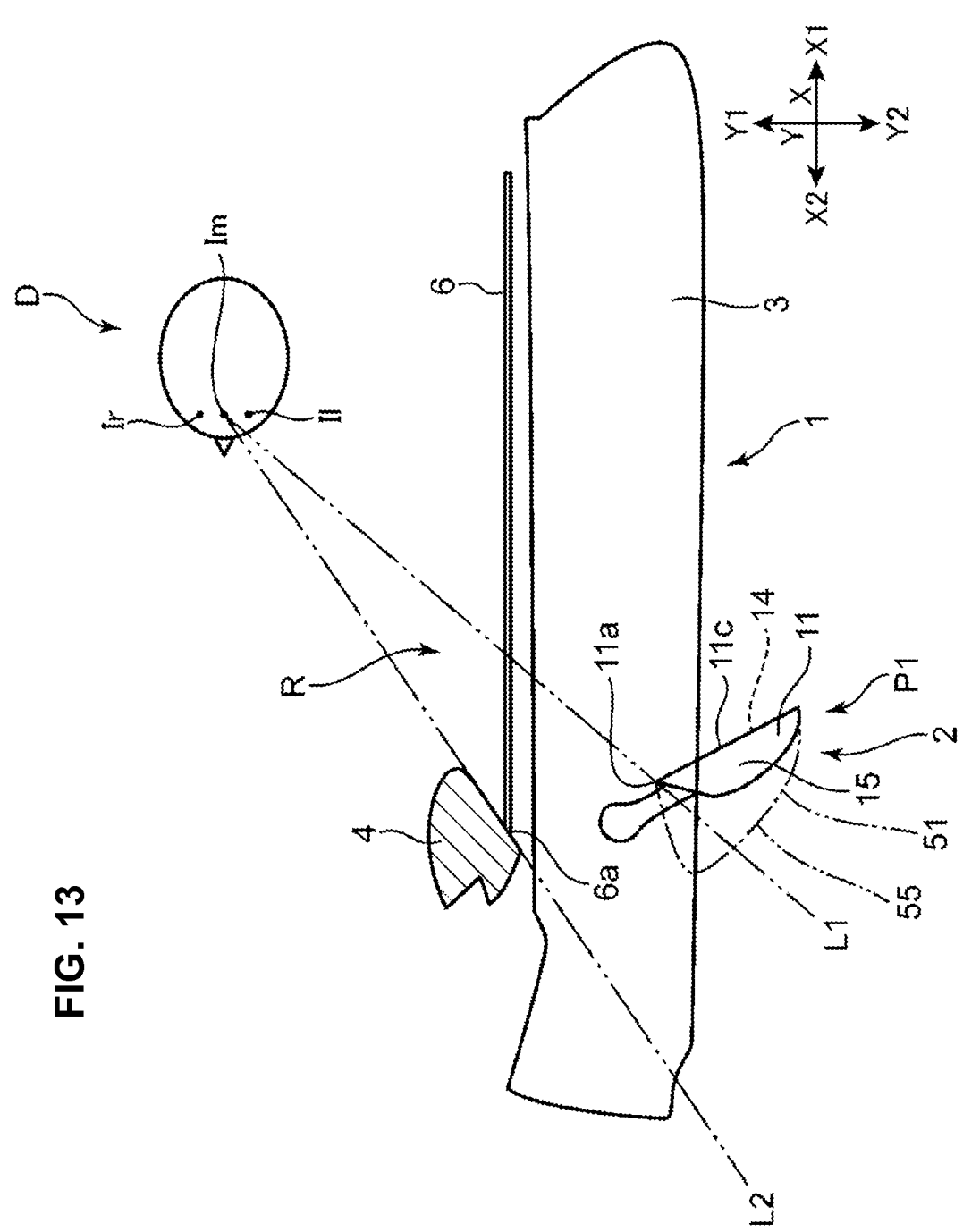
FIG. 13 is an explanatory diagram showing a state where a door-mirror body portion is not positioned in an area between a first imaginary line which connects a middle point between both eyes of a driver and an inner-end portion, in the vehicle width direction, of a rear face of the door-mirror body portion and a second imaginary line which connects the middle point and a front end portion of a door glass provided at the side door when the door mirror positioned close to a driver's seat takes a mirror-use position according to the embodiment of the present invention.
Figure 14:
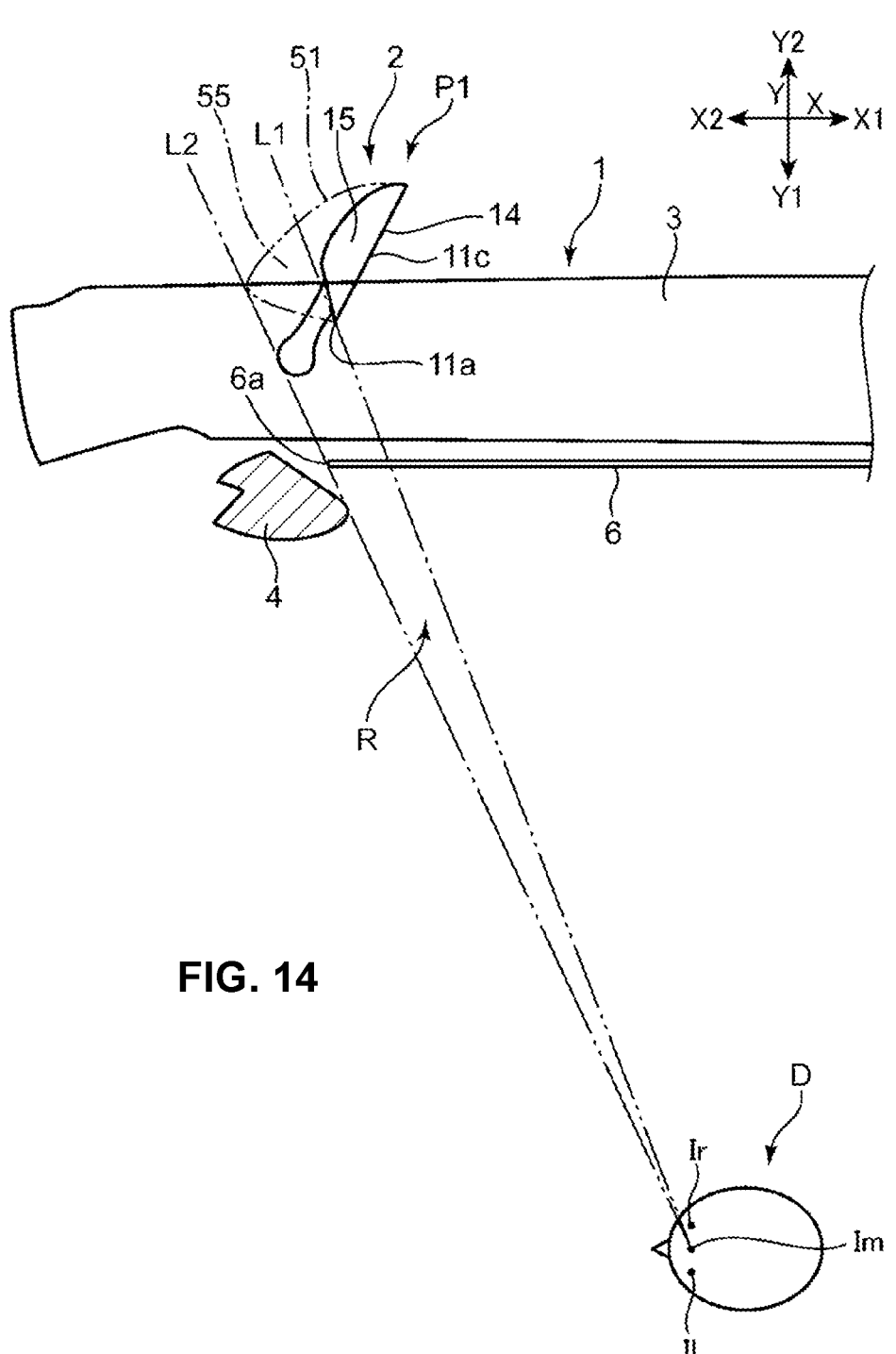
FIG. 14 is an explanatory diagram showing a state where a door-mirror body portion is not positioned in an area between a first imaginary line which connects the middle point between the both eyes of the driver and an inner-end portion, in the vehicle width direction, of a rear face of the door-mirror body portion and a second imaginary line which connects the middle point and a front end portion of a door glass provided at the side door when a door mirror positioned far away from the driver's seat takes a mirror-use position according to the embodiment of the present invention.

In the door mirror structure of the present embodiment, as shown in FIGS. 13 and 14, in order to improve the visibility from the cabin inside, the housing 15 of the door-mirror body portion 11 of the door mirror 2 positioned close to the driver's seat (see FIG. 13) or the door mirror 2 positioned far away from the driver's seat (see FIG. 14) has a shape such that the door-mirror body portion 11 taking the mirror-use position P1 is not positioned in an area R between a first imaginary line L1 which connects a middle point Im between both eyes of a driver of the vehicle and an inner-end portion 11*a*, in the vehicle width direction Y, of the rear face 11*e* of the door-mirror body portion 11 (i.e., an end portion of a vehicle-width-direction inward side Y1) and a second imaginary line L2 which connects the above-described middle point Im and a front end portion 6*a* of a door glass 6. Thereby, it is suppressed that the door-mirror body portion 11 comes into the above-described area R, so that the visibility is improved. Herein, the above-described middle point Im between the both eyes of the driver means a midway point between a left eye Il and a right eye Ir of the driver.

That is, the area R shown in FIGS. 13 and 14 is the one which is visible by the both eyes of the left eye Il and the right eye Ir of the driver, and the visibility can be improved by configuring the shape of the housing 15 such that the housing 15 of the door-mirror body portion 11 does not come into the area R.

Herein, in a conventional door-mirror body portion 51 shown by a two-dotted broken line in FIGS. 13 and 14, the longitudinal width of a housing 55 which stores the electromotive rotational unit therein becomes larger compared with the casing 15 of the present embodiment, so that the housing 55 comes into the above-described area R, which apparently hinders the visibility improvement.

Next, the specific and preferable structures of the door-mirror body portion 11 and the housing 15 to materialize the improvement of the visibility will be described further specifically referring to FIGS. 15-19.

Figure 15A:
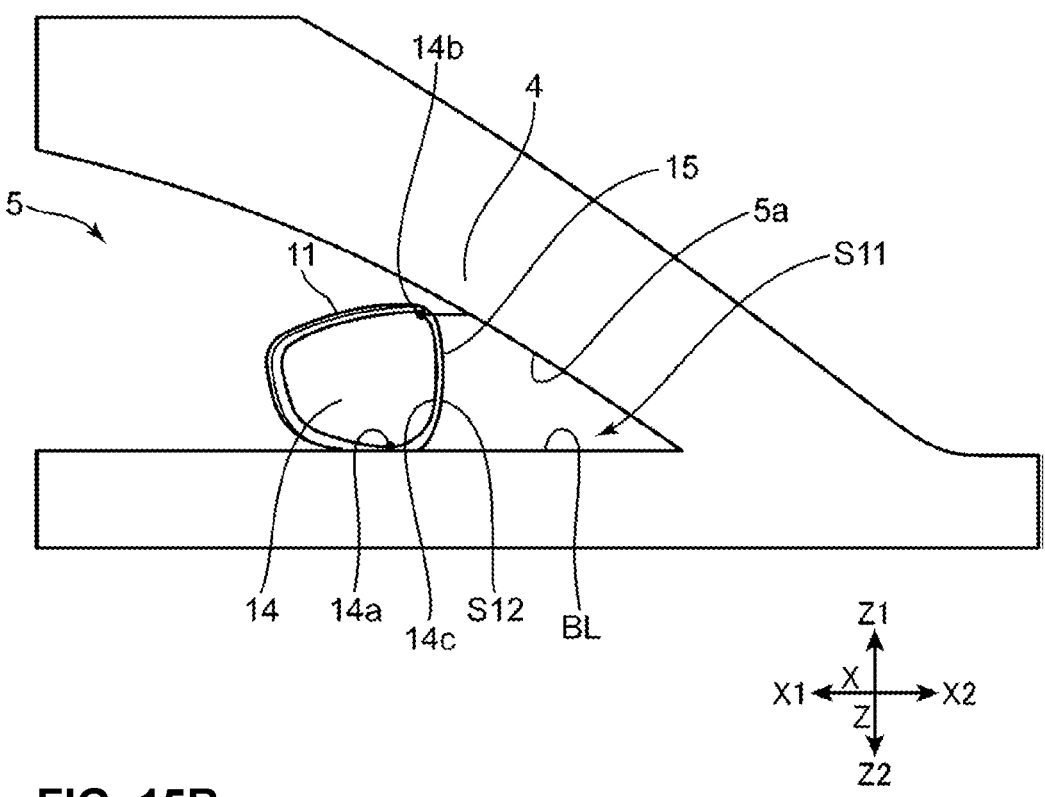
FIG. 15A is an explanatory diagram showing a ratio of an area which a casing of the door-mirror body portion occupies to an area of the mirror formed between an inner-end portion, in the vehicle width direction, of the mirror and the door-opening end portion which is positioned on a vehicle forward side of the mirror in a driver' view according to the embodiment of the present invention.
Figure 15B:
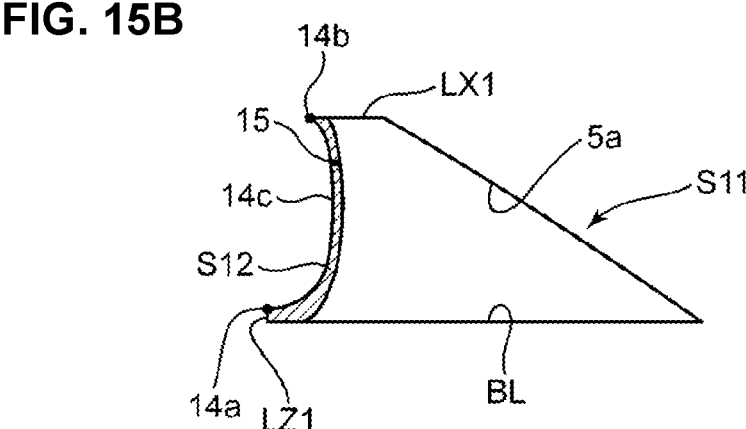
FIG. 15B is a diagram briefly showing the area shown in FIG. 15A.

As shown in FIGS. 15A and 15B, in the present embodiment in which the side door 1 has the door opening portion 5 which has a door-opening end portion 5a on a vehicle forward side X2 of the mirror 14, the shape of the housing 15 of the door-mirror body portion 11 is configured such that a ratio of an area S12 which the housing 15 occupies to an area S11 of the mirror 14 formed between an inner-end portion 14c, in the vehicle width direction Y, of the mirror 14 and the above-described door-opening end portion 5a in the driver' view is 10% or less.

Herein, the area S11 is the area which is enclosed by the inner-end portion 14c, in the vehicle width direction Y, of the mirror 14, the door-opening end portion 5a, the beltline BL, a line LZ1 which extends toward a downward side Z2 from a lower end 14a of the mirror 14, and a line LX1 which extends toward the vehicle forward side X2 from an upper end 14b of the mirror 14. The area S12 of the housing 15 is the area of a part of the housing 15 which is viewed on the vehicle forward side X2 of the inner end portion 14c, in the vehicle width direction Y, of the mirror 14 in the driver's view.

According to the present embodiment, since the door-mirror body portion 11 does not store the electromotive rotational unit 13 therein, the longitudinal width of the door-mirror body portion 11 becomes small, so that the area ratio of the area S12 to the area S11 can be decreased to 10% or less (e.g., 7% in the example shown in FIG. 15B). Thereby, it is suppressed that the door-mirror body portion 11 comes into the area S11, so that the visibility can be improved.

Figure 16A:
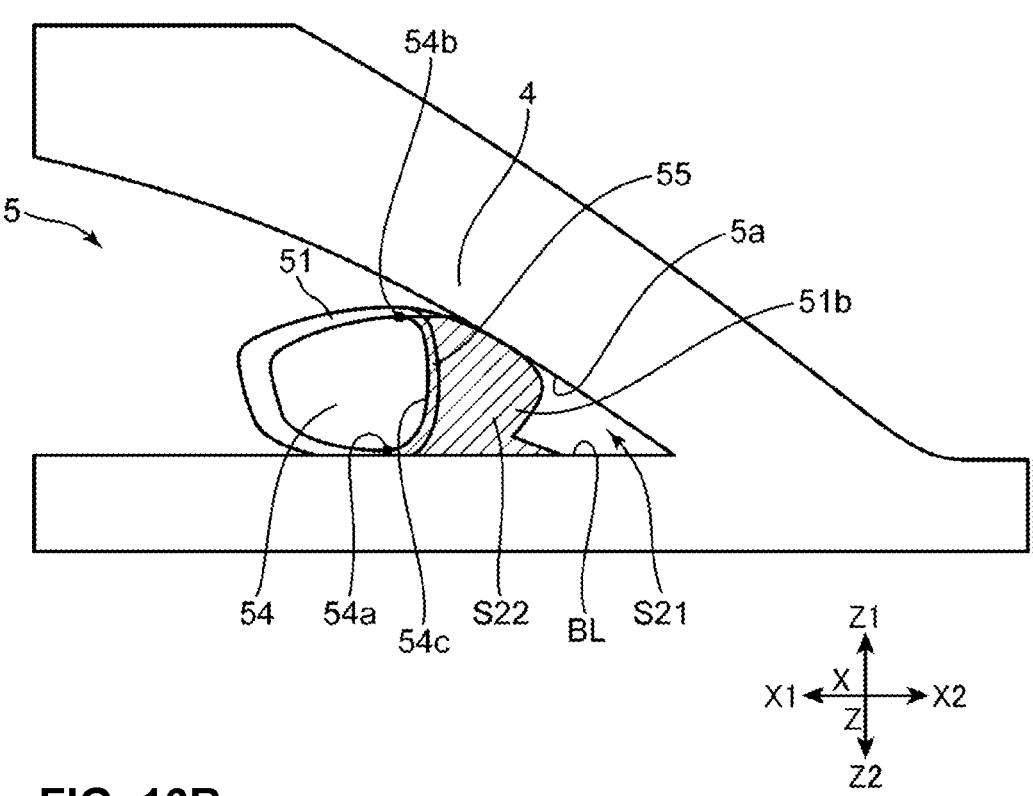
FIG. 16A is an explanatory diagram showing a ratio of an area which a casing of a door-mirror body portion which has a larger longitudinal width because of its storing an electromotive rotational unit occupies to an area of a mirror formed between an inner-end portion, in the vehicle width direction, of the mirror and a door-opening end portion which is positioned on the vehicle forward side of the mirror in the driver' view according to a comparative example of the present invention.
Figure 16B:
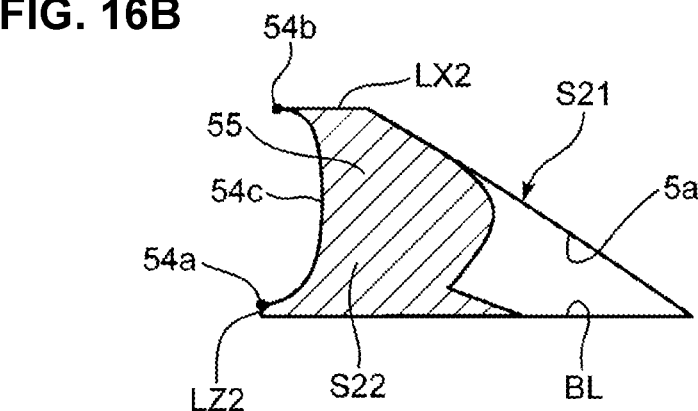
FIG. 16B is a diagram briefly showing the area shown in FIG. 16A.

Meanwhile, compared with the casing 15 shown in FIGS. 15A and 15B, according to the conventional door-mirror body portion 51 shown in FIGS. 16A and 16B, since the housing 55 stores the electromotive rotational unit therein, the longitudinal width of the housing 55 becomes larger. Therefore, as shown in FIGS. 16A and 16B, the shape of the conventional housing 55 is configured such that a ratio of an area S22 which the housing 55 occupies to an area S21 of a mirror 54 formed between an inner-end portion 54c, in the vehicle width direction Y, of the mirror 54 and a door-opening end portion 5a on the vehicle forward side X2 of the mirror 54 in the driver' view is considerably larger than 10% (e.g., nearly 67% in the example shown in FIG. 16B). Herein, the area S21 is the area which is enclosed by the inner-end portion 54c of the mirror 54, the door-opening end portion 5a, the beltline BL, a line LZ2 which extends toward the downward side Z2 from a lower end 54a of the mirror 54, and a line LX2 which extends toward the vehicle forward side X2 from an upper end 54b of the mirror 54. In the comparative example shown in FIG. 16, since the area ratio of the area S22 to the area S21 is larger than 10%, the door-mirror body portion 51 comes into the area S21 greatly, so that the visibility is hindered apparently.

Figure 17:
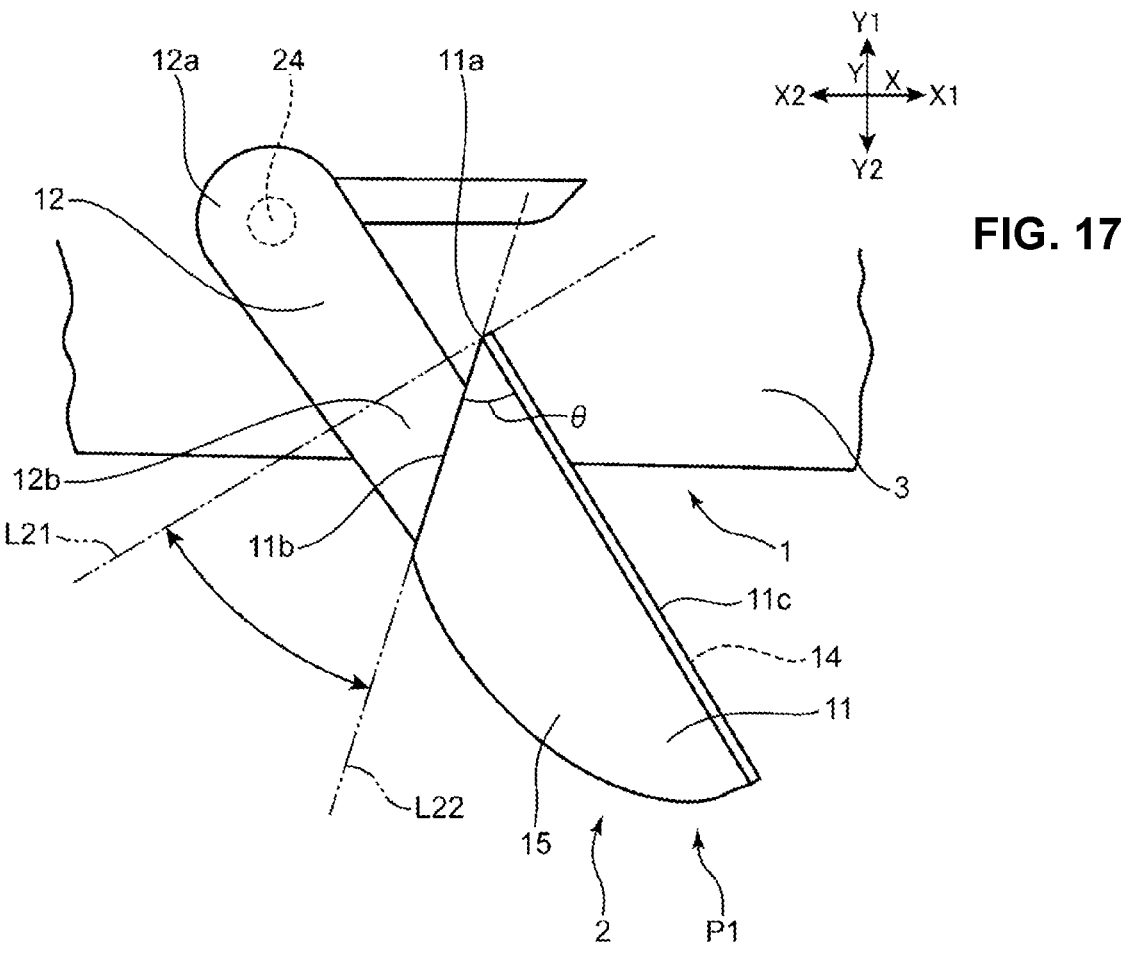
FIG. 17 is an explanatory diagram showing a state of the door mirror taking the mirror-use position shown in FIG. 3 where an inner end portion of a housing of the door-mirror body portion has an acute-angle shape and an inner face of the door-mirror body portion is inclined toward a vehicle outside relative to an imaginary line perpendicular to a surface of the mirror.

Further, in order to improve the visibility from the cabin inside further, the shape of the housing 15 of the door-mirror body portion 11 of the present embodiment is configured as shown in FIG. 17 such that an angle θ formed between the rear face 11c of the door-mirror body portion 11 and the inner face 11b of the door-mirror body portion 11 which faces the side door 1 in the plan view forms an acute angle.

In other words, the door-mirror body portion 11 of the present embodiment is configured such that the inner face 11b of the door-mirror body portion 11 which faces the side door 1 is inclined toward the vehicle outside relative to the imaginary line L1 which passes through the inner-end portion 11a of the door-mirror body portion 11 perpendicularly to the surface of the mirror 14 (i.e., inclined in a direction away from the side door 1) in the plan view in the mirror-use position P1. That is, the inner face 11b of the door-mirror body portion 11 extends along the line L2 which extends obliquely relative to the imaginary line L1 toward the vehicle outside with its start point of the inner-end portion 11a of the door-mirror body portion 11.

Further, in other words, the door-mirror body portion 11 taking the mirror-use position P1 is configured such that the width, in the longitudinal direction X, of the door-mirror body portion 11 becomes narrower from a middle position, in the vehicle width direction Y, of the door-mirror body portion 11 toward the inner-end portion 11a which is positioned on the side of the side door 1 in the vehicle width direction Y (becomes a taper shape).

Figure 18:
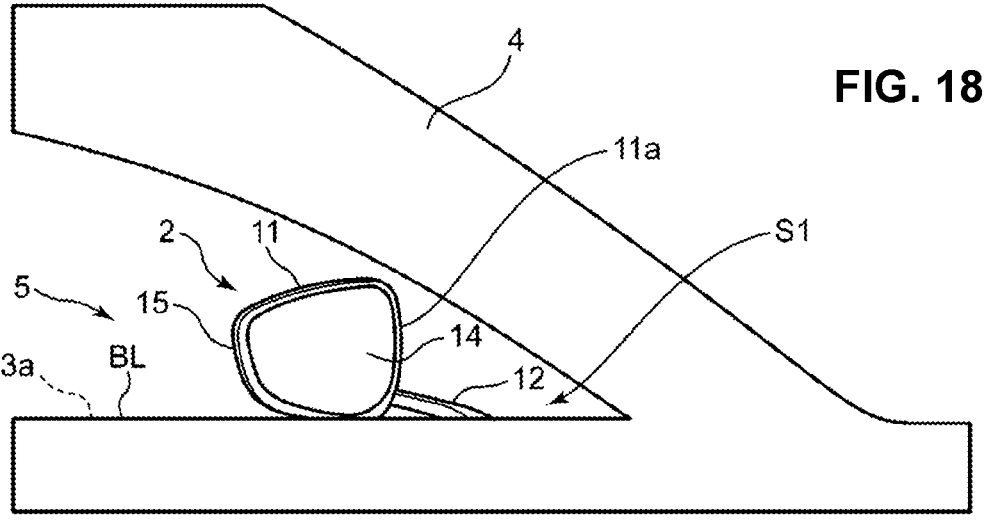
FIG. 18 is an explanatory diagram showing a state of the door mirror taking the mirror-use position shown in FIG. 17 where the visibility from the cabin inside is improved because the inner face of the door-mirror body portion is not viewed from the cabin inside.

By configuring the shape of the door-mirror body portion 11 as shown in FIG. 17, the inner face 11b of the door-mirror body portion 11 does not interrupt the visual field from the cabin inside as shown in FIG. 18. Thereby, the visual field of the space S1 located in front of the door-mirror body portion 11, i.e., the space S1 which is enclosed by the inner-end portion 11a of the door-mirror body portion 11, the A pillar 4, and the beltline BL, can be secured widely, so that the visibility is improved.

Figure 19:
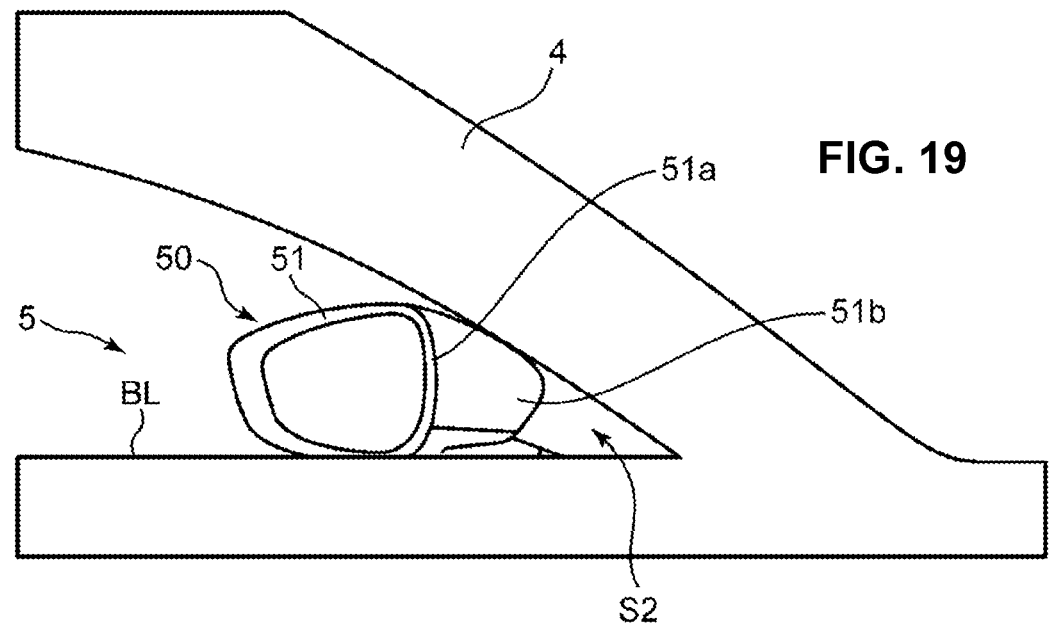
FIG. 19 is a diagram showing a state of a conventional door mirror where the inner face of the door-mirror body portion is viewed from the cabin inside because the door-mirror body portion storing the electromotive rotational unit therein has the larger longitudinal width according to the comparative example of the present invention.

Meanwhile, in the structure in which the electromotive rotational unit (not illustrated) is stored at a door-mirror body portion 51 like a door mirror 50 which is shown in FIG. 19 as the comparative example, since the longitudinal width of the door-mirror body portion 51 becomes larger, the inner face 51b of the door-mirror body portion 51 becomes visible from the cabin inside. Accordingly, the space S2 which is located in front of the door-mirror-body portion 51, i.e., the space S2 which is enclosed by the inner-end portion 51a of the door-mirror body portion 51, the A pillar 4, and the beltline BL becomes narrower, so that it is apparent that the visibility is deteriorated.

Features of Present Embodiment

[1]

The door mirror structure of the side door 1 of the present invention comprises the door-mirror body portion 11 provided with the mirror 14 to obtain the rearward visual field of the vehicle and the housing 15 holding the mirror 14, the mirror base 12 having the tip-end portion 12b fixed to the door-mirror body portion 11 and the base-end portion 12a provided away from the tip-end portion 12b, wherein the base-end portion 12a is attached to the side door 1 such that the door-mirror body portion 11 and the mirror base 12 is rotatable between the mirror-use position P1 where the mirror 14 is visible from the cabin inside and the mirror-storage position P2 which is located on the inward side, in the vehicle width direction Y, of the mirror-use position P1, and the electromotive rotational unit 13 as a drive unit to rotate the door-mirror body portion 11 and the mirror base 12 between the mirror-use position P1 and the mirror-storage position P2. The electromotive rotational unit 13 is provided in the space portion 20 inside the side door 1 as shown in FIGS. 7-10 and 12.

Further, as shown in FIGS. 13 and 14, the housing 15 of the door-mirror body portion 11 of the door mirror 2 positioned close to the driver's seat (see FIG. 13) or the door mirror 2 positioned far away from the driver's seat (see FIG. 14) has the shape such that the door-mirror body portion 11 taking the mirror-use position P1 is not positioned in the area R between the first imaginary line L1 which connects the middle point Im between the both eyes of the driver and the inner-end portion 11a, in the vehicle width direction Y, of the rear face 11c of the door-mirror body portion 11 and the second imaginary line L2 which connects the middle point Im and the front end portion 6a of the door glass 6.

According to this structure, since the electromotive rotational unit 13 which is a heavy object is provided inside the side door 1, the vertical moment generated at the door mirror 2 which is caused by a road-surface input during the vehicle traveling (i.e., vibrations or outer forces which are mainly generated in the vertical direction Z, which may be caused by an unevenness (concave/convex) of the road surface) can be decreased, so that the vibrations of the mirror 14 can be suppressed.

Further, since the electromotive rotational unit 13 is provided at the side door 1, the door-mirror body portion 11 can be shortened in its longitudinal width and thereby compact (or thin) compared with the conventional door structure in which the electromotive rotational unit 13 is stored at the door-mirror body portion 11. Thus, according to the present door mirror structure, the shape of the housing 15 of the door-mirror body portion 11 can be configured such that the space where the door-mirror body portion 11 occupies in the conventional electromotive rotational unit 13 is reduced and thereby the visibility is improved, maintaining the automatic storing performance of the door mirror 2. That is, as described above, by configuring the shape of the housing 15 of the door-mirror body portion 11 such that the door-mirror body portion 11 taking the mirror-use position P1 is not positioned in the area between the first imaginary line L1 which connects the middle point Im between the driver's both eyes and the inner-end portion 11a, in the vehicle width direction Y, of the rear face 11c of the door-mirror body portion 11 and the second imaginary line L2 which connects the above-described middle point Im and the front end portion of the door glass 6 provided at the side door 1, the visibility can be improved. Thereby, it can be suppressed that the door-mirror body portion 11 comes into the area R between the inner-end portion 14c of the mirror 14 and the glass front-end portion 6a in the driver's view. Consequently, the visibility from the cabin inside can be improved.

Further, according to the present structure, in the door mirror structure comprising the door-mirror body portion 11 provided with the mirror 14 and the mirror base 12 having the tip-end portion 12b fixed to the door-mirror body portion 11, the electromotive rotational unit 13 moves the door-mirror body portion 11 and the mirror base 12 from the mirror-use position P1 to the mirror-storage position P2. Accordingly, respective protrusion quantities of the door-mirror body portion 11 and the mirror base 12 which protrude from the side face of the side door 1 can be made small in a state where the door-mirror body portion 11 and the mirror base 12 are rotated to the mirror-storage position P2, so that the vehicle width can be minimized.

[2]

In the door mirror structure of the present embodiment, the electromotive rotational unit 13 is provided inside the side door 1, so that the electromotive rotational unit 13 can be protected from a foreign substance or the like which exist in the vehicle outside by the door panel 3 constituting the outside face of the side door 1. Herein, the electromotive rotational unit 13 may be positioned outside of the side door 1, but in this case, a large cover member to protect the electromotive rotational unit 13 or the like are required.

[3]

In the door mirror structure of the present embodiment, this structure further comprises the rotational support axis 24 provided to be connected to the base end portion 12a of the mirror base 12 and rotatably support the door-mirror body portion 11 and the mirror base 12 between the mirror-use position P1 and the mirror-storage position P2. The rotational support axis 24 extends from the base end portion 12a to the inside of the side door 1 and is rotated by the electromotive rotational unit 13.

According to this structure, since the rotational support axis 24 to rotatably support the door-mirror body portion 11 and the mirror base 12 is further provided, the door-mirror body portion 11 and the mirror base 12 can be rotated between the mirror-use position P1 and the mirror-storage position P2 by rotating the door-mirror body portion 11 and the mirror base 12 around the rotational support axis 24 by means of the electromotive rotational unit 13 provided inside the side door 1. Accordingly, rotating of the door-mirror body portion 11 and the mirror base 12 between the mirror-use position P1 and the mirror-storage position P2 can be materialized with a simple structure.

[4]

In the door mirror structure of the present embodiment, the electromotive rotational unit 13 (specifically, the primary structural elements of the motor 32, the reduction gear 33, the torque limiter 34, and the output axis 35) is provided on the axis line of the rotational support axis 24.

According to this structure, since the electromotive rotational unit 13 is provided on the axis line of the rotational support axis 24, a power transmission system from the electromotive rotational unit 13 to the rotational support axis 24 can be made simple and compact. Thereby, the electromotive rotational unit 13 can be properly positioned in a limited space inside the side door 1.

[5]

In the door mirror structure of the present embodiment, the penetration hole 26 where the rotational support axis 24 passes is formed at the door panel 3 which constitutes the outside face of the side door 1. The cover member 27 to cover the gap between the penetration hole 26 and the rotational support axis 24 from the vehicle outside is further provided.

According to this structure, since the cover member 27 covers the gap between the penetration hole 26 and the rotational support axis 24 from the vehicle outside, appearance of the vehicle is improved, and also water can be prevented from coming into the inside of the door panel 3 through the gap.

[6]

In the door mirror structure of the present embodiment, the electromotive rotational unit 13 is fixed to the beltline reinforcement 21 which is provided inside the side door 1 and constitutes the frame of the side door 1.

According to this structure, since the electromotive rotational unit 13 is fixed to the beltline reinforcement 21 as the frame member constituting the frame of the side door 1, the support rigidity of the electromotive rotational unit 13 is improved.

[7]

In the door mirror structure of the present embodiment, the above-described frame member is the beltline reinforcement 21 which extends in the vehicle longitudinal direction X along the beltline BL at the window lower-end edge of the side door 1.

According to this structure, the above-described door mirror structure can be adopted to the conventional door structure widely by fixing the electromotive rotational unit 13 to the beltline reinforcement 21 which is generally used at the conventional door structure.

[8]

In the door mirror structure of the present embodiment, the beltline reinforcement 21 is made of an aluminum-made extrusion material.

According to this structure, since the beltline reinforcement 21 is made of the aluminum-made extrusion material, securement of the support rigidity of the electromotive rotational unit 13 and light weight of the vehicle can be compatibly attained.

[9]

In the door mirror structure of the present embodiment, as shown in FIGS. 15A and 15B, the side door 1 has the door opening portion 5 which has the door-opening end portion 5a on the vehicle forward side X2 of the mirror 14. The shape of the housing 15 of the door-mirror body portion 11 is configured such that the ratio of the area S12 which the housing 15 occupies to the area S11 of the mirror 14 formed between the inner-end portion 11a, in the vehicle width direction Y, of the mirror 14 and the door-opening end portion 5a in the driver' view is 10% or less.

According to this structure, the ratio of the area S12 which the housing 15 occupies to the area S11 of the mirror 14 formed between the inner-end portion 11a, in the vehicle width direction Y, of the mirror 14 and the door-opening end portion 5a can be reduced to 10% or less. Consequently, the visibility from the cabin inside can be further improved.

[10]

In the door mirror structure of the present embodiment, as shown in FIG. 17, the shape of the housing 15 of the door-mirror body portion 11 is configured such that the angle θ formed between the rear face 11e of the door-mirror body portion 11 and the inner face 11b of the door-mirror body portion 11 which faces the side door 1 in the plan view forms the acute angle.

According to this structure, the visual field from the cabin inside is not interrupted by the inner face 11b of the door-mirror body portion 11, so that the visibility from the cabin inside can be improved securely.

[11]

In the door mirror structure of the present embodiment, as shown in FIG. 17, the door-mirror body portion 11 taking the mirror-use position P1 is configured such that the width, in the longitudinal direction X, of the door-mirror body portion 11 becomes narrower from the middle position, in the vehicle width direction Y, of the door-mirror body portion 11 toward the inner-end portion 11a, in the vehicle width direction Y, of the door-mirror body portion 11 in the plan view.

According to this structure, since the longitudinal width of the door-mirror body portion 11 becomes narrower from the middle position toward the inner-end portion 11a, the visual field from the cabin inside is not interrupted by the inner face 11b of the door-mirror body portion 11. Consequently, the visibility from the cabin inside is so secured at the maximum that the visibility can be improved further.

[12]

In the door mirror structure of the present embodiment, as shown in FIG. 13, the door-mirror body portion 11 taking the mirror-use position P1 is configured such that the inner face 11b of the door-mirror body portion 11 which faces the side door 1 is inclined toward the vehicle outside relative to the imaginary line L1 which passes through the inner-end portion 11a of the door-mirror body portion 11 perpendicularly to the surface of the mirror 14 in the plan view.

Accordingly, since the door-mirror body portion 11 taking the mirror-use position P1 is configured such that the inner face 11b of the door-mirror body portion 11 is inclined toward the vehicle outside relative to the imaginary line L1 perpendicular to the surface of the mirror 14 in the mirror-use position P1, the visual field from the cabin inside is not interrupted by the inner face 11b of the door-mirror body portion 11. Consequently, the visibility from the cabin inside is secured at the maximum, thereby improving the visibility further.

MODIFIED EXAMPLES

[A]

In the drive unit of the present invention, any other type of drive unit than the above-described electromotive rotational unit is applicable as long as the door-mirror body portion 11 and the mirror base 12 can be rotated between the mirror-use position P1 and the mirror-storage position P2. For example, the drive unit using any other driving force than electricity, such as an oil pressure or an air pressure, is applicable.

[B]

Further, while the above-described embodiment is configured such that the door-mirror body portion 11 and the mirror base 12 are rotated between the mirror-use position P1 and the mirror-storage position P2 by rotating them around the rotational support axis 24, the above-described rotating of the members 11, 12 between the positions P1, P2 may be attained by any other moving manner than rotating, such as combined moving manner of rotation and linear moving.

[C]

The mirror of the present invention includes any type as long as means for obtaining the rearward visual field is adopted. For example, the optical mirror 14 to obtain the rearward visual filed by reflection of the light from the vehicle rearward side or a so-called digital mirror capable of obtaining the rearward visual field by means of a television camera provided at the door-mirror body portion 11 are included in the concept of the mirror of the present invention.

What is claimed is:

1. A door mirror structure of a side door of a vehicle, comprising:

a door-mirror body portion provided with a mirror to obtain a rearward visual field of the vehicle and a housing holding the mirror;

a mirror base having a tip-end portion fixed to the door-mirror body portion and a base-end portion provided away from the tip-end portion, the base-end portion being attached to the side door such that the door-mirror body portion and the mirror base is rotatable between a mirror-use position where the mirror is visible from a cabin inside and a mirror-storage position which is located on an inward side, in a vehicle width direction, of the mirror-use position;

a drive unit to rotate the door-mirror body portion and the mirror base between the mirror-use position and the mirror-storage position; and a rotational support axis provided to be connected to said base end portion of the mirror base and rotatably support said door-mirror body portion and said mirror base between said mirror-use position and said mirror-storage position, wherein said rotational support axis extends from said base end portion to the inside of the side door and is rotated by said drive unit, wherein said drive unit is provided inside the side door.

2. The door mirror structure of claim 1, wherein said drive unit is provided on an axis line of said rotational support axis.

3. The door mirror structure of claim 2, wherein a penetration hole where said rotational support axis passes is formed at a door panel which constitutes an outside face of the side door, and a cover member to cover a gap between said penetration hole and said rotational support axis from a vehicle outside is provided.

4. The door mirror structure of claim 3, wherein said drive unit is fixed to a frame member which is provided inside the side door and constitutes a frame of the side door.

5. The door mirror structure of claim 4, wherein said frame member is a beltline reinforcement which extends in a vehicle longitudinal direction along a beltline at a window lower-end edge of the side door.

6. The door mirror structure of claim 5, wherein the side door has a door opening portion which has a door-opening end portion on a vehicle forward side of said mirror, and said shape of the housing is configured such that a ratio of an area which the housing occupies to an area of the mirror formed between an inner-end portion, in the vehicle width direction, of the mirror and said door-opening end portion in a driver' view is 10% or less.

7. The door mirror structure of claim 6, wherein said shape of the housing is configured such that an angle formed between the rear face of said door-mirror body portion and an inner face of the door-mirror body portion which faces the side door in a plan view forms an acute angle.

8. The door mirror structure of claim 7, wherein said door-mirror body portion taking the mirror-use position is configured such that a width, in a longitudinal direction, of the door-mirror body portion becomes narrower from a middle position, in the vehicle width direction, of the door-mirror body portion toward an inner-end portion, in the vehicle width direction, of the door-mirror body portion in a plan view.

9. The door mirror structure of claim 1, wherein said drive unit is fixed to a frame member which is provided inside the side door and constitutes a frame of the side door.

10. The door mirror structure of claim 1, wherein said shape of the housing is configured such that an angle formed between the rear face of said door-mirror body portion and an inner face of the door-mirror body portion which faces the side door in a plan view forms an acute angle.

11. The door mirror structure of claim 1, wherein said door-mirror body portion taking the mirror-use position is configured such that a width, in a longitudinal direction, of the door-mirror body portion becomes narrower from a middle position, in the vehicle width direction, of the door-mirror body portion toward an inner-end portion, in the vehicle width direction, of the door-mirror body portion in a plan view.

* * * * *